United States Patent
Lee et al.

(10) Patent No.: US 10,190,787 B2
(45) Date of Patent: Jan. 29, 2019

(54) HUMIDIFICATION AND AIR CLEANING APPARATUS

(71) Applicant: LG Electronics, Inc., Seoul (KR)

(72) Inventors: Kyoungho Lee, Seoul (KR); Taeyoon Kim, Seoul (KR); Kunyoung Lee, Seoul (KR); Jongsu Lee, Seoul (KR); Jungwoo Lee, Seoul (KR); Chungook Chong, Seoul (KR); Younggu Lee, Seoul (KR); Jieun Choi, Seoul (KR); Hyuckju Kwon, Seoul (KR); Sanghyuk Son, Seoul (KR)

(73) Assignee: LG ELECTRONICS INC., Seoul (KR)

(*) Notice: Subject to any disclaimer, the term of this patent is extended or adjusted under 35 U.S.C. 154(b) by 98 days.

(21) Appl. No.: 15/338,137

(22) Filed: Oct. 28, 2016

(65) Prior Publication Data

US 2017/0122594 A1 May 4, 2017

Related U.S. Application Data

(60) Provisional application No. 62/248,463, filed on Oct. 30, 2015, provisional application No. 62/355,118, filed on Jun. 27, 2016.

(30) Foreign Application Priority Data

Nov. 7, 2015 (KR) .................. 10-2015-0156254
Dec. 24, 2015 (KR) .................. 10-2015-0185850
(Continued)

(51) Int. Cl.
*F24F 6/00* (2006.01)
*B01F 3/04* (2006.01)
(Continued)

(52) U.S. Cl.
CPC ............ *F24F 6/04* (2013.01); *B01D 46/10* (2013.01); *B01F 3/04028* (2013.01);
(Continued)

(58) Field of Classification Search
CPC .... B01F 3/04; B01F 3/04007; B01F 3/04021; B01F 3/04028; B01F 3/04085; F24F 6/14; F24F 6/16
(Continued)

(56) References Cited

U.S. PATENT DOCUMENTS 5,213,595 A 5/1993 Kim
2015/0115481 A1 4/2015 Jang et al.

FOREIGN PATENT DOCUMENTS

GB 934432 A 8/1963
JP 53-130863 U 10/1978
(Continued)

OTHER PUBLICATIONS

LG Electronics Inc.—LG Signature Catalog, "Model Name: AW141YAW", Mar. 17, 2016.

*Primary Examiner* — Robert A Hopkins
(74) *Attorney, Agent, or Firm* — Dentons US LLP

(57) ABSTRACT

Provided is a humidification and air cleaning apparatus including a water tank storing water; an air wash inlet formed at the water tank and communicating the inside and the outside of the water tank and a water tank humidification medium formed of a material for absorbing water and providing humidification on air passing through the air wash inlet. The water tank humidification medium is located inside the air wash inlet to cover the air wash inlet.

18 Claims, 27 Drawing Sheets

(30) Foreign Application Priority Data

Mar. 28, 2016 (KR) ........................ 10-2016-0037235
Jun. 30, 2016 (KR) ........................ 10-2016-0083087
Oct. 6, 2016 (KR) ........................ 10-2016-0129355

(51) Int. Cl.
*F24F 6/04* (2006.01)
*F24F 6/14* (2006.01)
*F24F 3/16* (2006.01)
*F24F 6/16* (2006.01)
*B01D 46/10* (2006.01)
*F24F 13/20* (2006.01)
*F24F 13/28* (2006.01)

(52) U.S. Cl.
CPC ............ *B01F 3/04085* (2013.01); *F24F 3/16* (2013.01); *F24F 6/14* (2013.01); *F24F 6/16* (2013.01); *F24F 13/20* (2013.01); *F24F 13/28* (2013.01); *B01D 2279/50* (2013.01); *F24F 2006/008* (2013.01); *F24F 2006/046* (2013.01)

(58) Field of Classification Search
USPC ........................................ 261/72.1, 83, 100
See application file for complete search history.

(56) References Cited

FOREIGN PATENT DOCUMENTS

| | | |
|---|---|---|
| JP | 55-94627 U | 7/1980 |
| JP | 55-150941 U | 10/1980 |
| JP | 56-117034 A | 9/1981 |
| JP | 2003-307327 A | 10/2003 |
| JP | 2011-242026 A | 12/2011 |
| KR | 10-2012-0076284 A | 7/2012 |
| WO | 2013/141549 A1 | 9/2013 |
| WO | 2014/185614 A1 | 11/2014 |
| WO | 2015/016657 A1 | 2/2015 |
| WO | 2015/098984 A1 | 7/2015 |
| WO | 2015/099296 A1 | 7/2015 |

HUMIDIFICATION AND AIR CLEANING APPARATUS

CROSS-REFERENCE TO RELATED APPLICATIONS

This application claims the benefit of U.S. Provisional Patent Application Nos. 62/248,463 filed Oct. 30, 2015 and 62/355,118 filed Jun. 27, 2016; and Korean Patent Application Nos. 10-2015-0156254 filed Nov. 7, 2015, 10-2015-0185850 filed Dec. 24, 2015; 10-2016-0037235 filed Mar. 28, 2016; 10-2016-0083087 filed Jun. 30, 2016 and 10-2016-0129355 filed Oct. 6, 2016, which is incorporated herein by reference for all purposes as if fully set forth herein.

BACKGROUND OF THE INVENTION

The present invention disclosed herein relates to an apparatus for both humidification and air cleaning.

Air conditioning apparatuses include air conditioners that control the temperature of air, air cleaners that remove foreign substances from air to maintain air cleanliness, humidifiers that increase humidity in the air, and dehumidifiers that reduce humidity in the air.

Typical humidifiers are classified into a vibration type which atomizes water on a vibrating plate and discharges it into air and a natural evaporation type that evaporates water in a humidification filter.

The natural evaporation type of humidifier is classified into a disc type of humidifier which rotates a disc using a driving force and allows water to naturally evaporate from the surface of the disc in the air and a humidification filter type of humidifier which allows water to naturally evaporate from a wet humidification medium by flowing air.

In a typical humidifier, a portion of flowing air during the humidification process is filtered by a filter.

However, since a typical humidifier is used only in a low humidity season and an air cleaner has no humidification function, a user needs to purchase both products.

Also, since a typical humidifier has an air cleaning function as an additional function in addition to a humidification function as a main function, the air cleaning function is weak.

Furthermore, there is a limitation in that a typical humidifier or air cleaner cannot separately operate the humidification or air cleaning function.

SUMMARY OF THE INVENTION

The present invention provides a humidification and air cleaning apparatus which can separately operate a humidification function and an air cleaning function.

The present invention also provides a humidification and air cleaning apparatus which allows a user to check water drops formed on a humidification flow passage with his/her eyes and to intuitively know the humidification state.

The present invention also provides a humidification and air cleaning apparatus having a structure where a humidification medium is not submerged under water.

The present invention also provides a humidification and air cleaning apparatus for preventing water that wets a water tank humidification medium from leaking to the outside through an air wash inlet.

The present invention also provides a humidification and air cleaning apparatus for guiding water supplied for watering to a water tank.

The present invention also provides a humidification and air cleaning apparatus for guiding water sprayed for a rain view to a water tank.

The present invention also provides a humidification and air cleaning apparatus for guiding water supplied to an upper part to a water tank.

The objectives of the present invention are not limited to the above-mentioned objectives, and other objectives that are not mentioned will be clearly understood by persons skilled in the art from the following description.

Embodiments of the present invention provide humidification and air cleaning apparatuses including: a water tank storing water; an air wash inlet formed at the water tank and communicating the inside and the outside of the water tank; and a water tank humidification medium formed of a material for absorbing water and providing humidification on air passing through the air wash inlet, wherein the water tank humidification medium is located inside the air wash inlet to cover the air wash inlet.

In some embodiments, the air passing through the air wash inlet may form a pressure to flow from the outside of the air tank to the inside of the water tank.

In some embodiments, the air wash inlet unit may be formed in a circumference of the water tank and the water humidification medium may cover the entire air wash inlet.

In some embodiments, a lower end of the water tank humidification medium may be located inside the water tank.

In some embodiments, an upper end of the water tank humidification medium may be located outside the water tank and its lower end may be located inside the water tank.

In some embodiments, the humidification and air cleaning apparatuses may further include a watering unit disposed inside the water tank and spraying the water stored in the water tank, wherein the water tank humidification medium may be spaced apart from the water stored in the water tank and water sprayed from the watering unit may wet the water tank humidification medium.

In some embodiments, a portion of the water tank humidification medium may overlap the water tank and the watering unit may spray water to the overlapping portion.

In some embodiments, the humidification and air cleaning apparatuses may further include a water tank humidification medium housing where the water tank humidification medium is installed, wherein the water tank humidification medium housing may further include a dripping water prevention flow passage for guiding water to the water tank.

In some embodiments, an upper end of the water tank humidification medium housing may be located outside the water tank and its lower end may be located inside the water tank.

In some embodiments, a lower end of the water tank humidification medium housing may overlap the water tank.

In some embodiments, the water tank humidification medium housing may be mounted detachable from the water tank and a guide for guiding flowing-down water to the inside of the water tank may be disposed at an upper end of the water tank humidification medium housing.

In some embodiments, the humidification and air cleaning apparatuses may further include a visual body forming at least a portion of the water tank and formed of a transparent material, wherein the air wash inlet may be disposed at a lower side of the visual body.

In some embodiments, a side surface of the visual body may be formed inclined toward the inside of the water tank.

In some embodiments, a reservoir for temporarily storing flowing-down water may be formed at the inside of the visual body and the reservoir may be located at an upper side of the air wash inlet.

In some embodiments, the humidification and air cleaning apparatuses may further include a water tank humidification medium housing where the water tank humidification medium is installed, wherein an upper end of the water tank humidification medium housing may overlap the visual body and its lower end may overlap the water tank.

In some embodiments, the water tank humidification medium housing may be mounted detachable from the visual body.

In some embodiments, the humidification and air cleaning apparatuses may further include a water tank humidification medium housing where the water tank humidification medium is installed and a guide disposed at an upper end of the water tank humidification medium housing and guiding flowing-down water to the inside of the water tank.

In some embodiments, the humidification and air cleaning apparatuses may further include: a water tank humidification medium housing where the water tank humidification medium is installed; a reservoir formed inside the visual body and temporarily storing flowing-down water; and a guide installed at an upper end of the water tank humidification medium housing and guiding the flowing-down water to the inside of the water tank, wherein the guide may be located at an upper side of the reservoir.

In some embodiments, the humidification and air cleaning apparatuses may further include a top cover assembly disposed at an upper inside of the visual body and forming a water supply flow passage and a discharge flow passage, wherein water flowing to the discharge flow passage may flow down along the inside of the visual body and a reservoir for temporarily storing the flowing-down water may be formed at the visual body.

In some embodiments, the humidification and air cleaning apparatus may further include: a watering unit disposed inside the water tank and spraying water stored in the water tank; and a water tank medium housing where the water tank humidification medium is installed, wherein the water tank humidification medium may be spaced apart from the water stored in the water tank and water sprayed from the watering unit may wet the water tank humidification medium; and the water tank humidification medium housing may further include a frame disposed outside the air wash inlet and overlapping the water tank and the watering unit may spray water to the frame.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Figure 1:
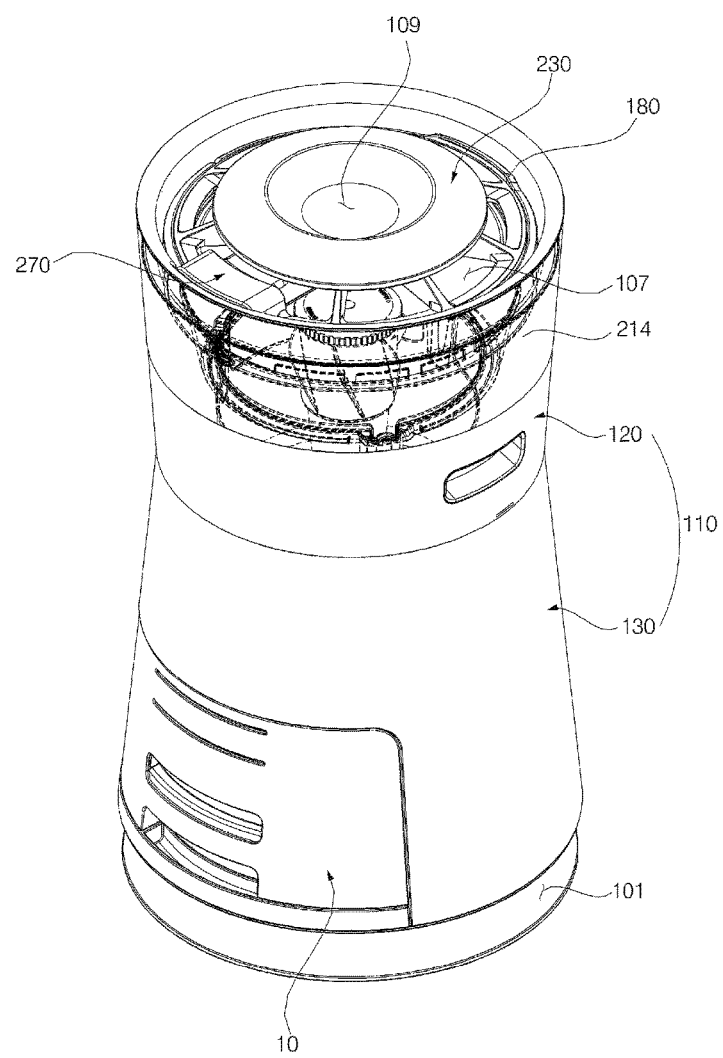
FIG. 1 is a perspective view illustrating a humidification and air cleaning apparatus according to a first embodiment of the present invention.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

Hereinafter, exemplary embodiments of the present invention will be described in detail with reference to the accompanying drawings.

Figure 2:
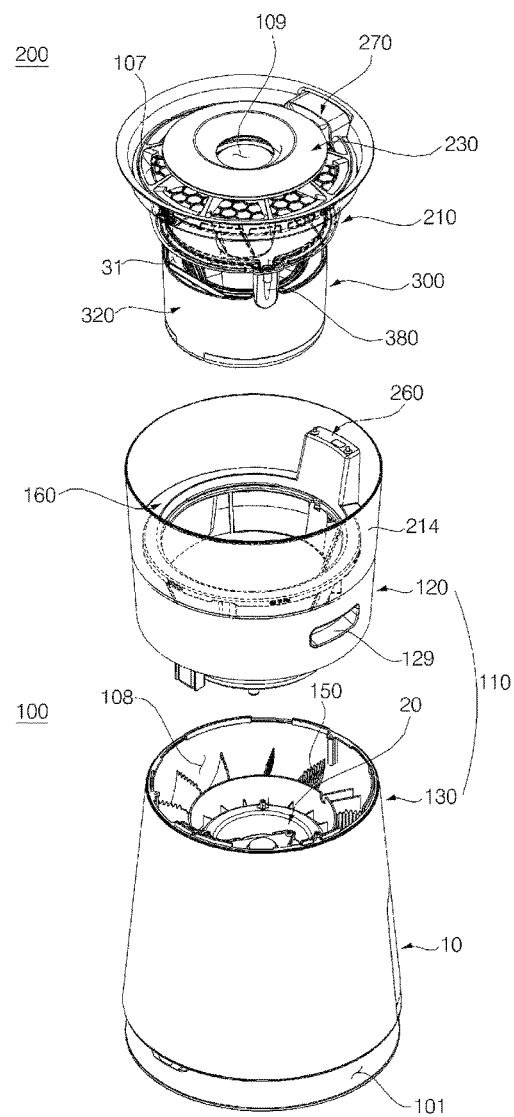
FIG. 2 is an exploded perspective view of FIG. 1.
Figure 3:
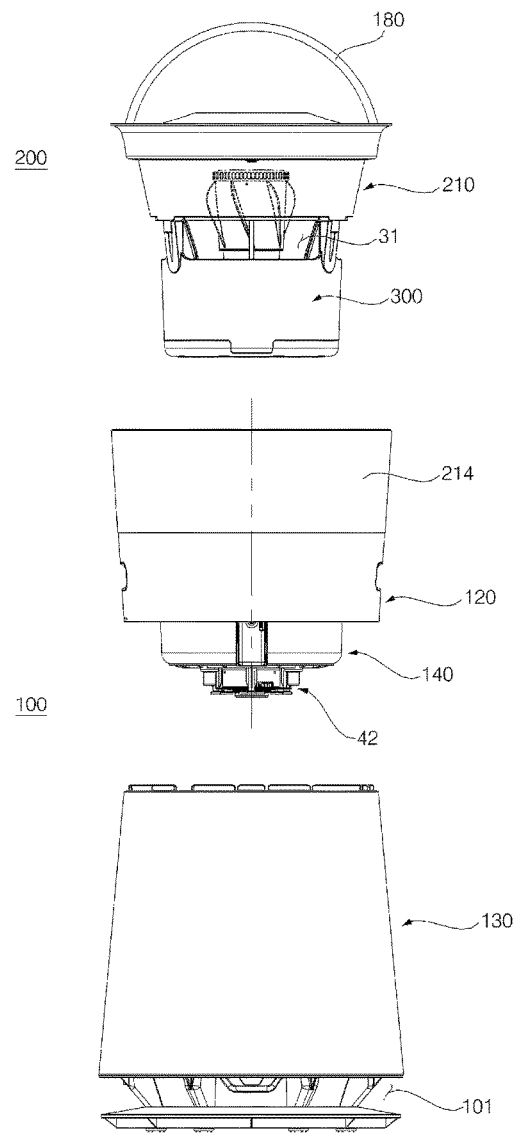
FIG. 3 is an exploded front view of FIG. 1.
Figure 4:
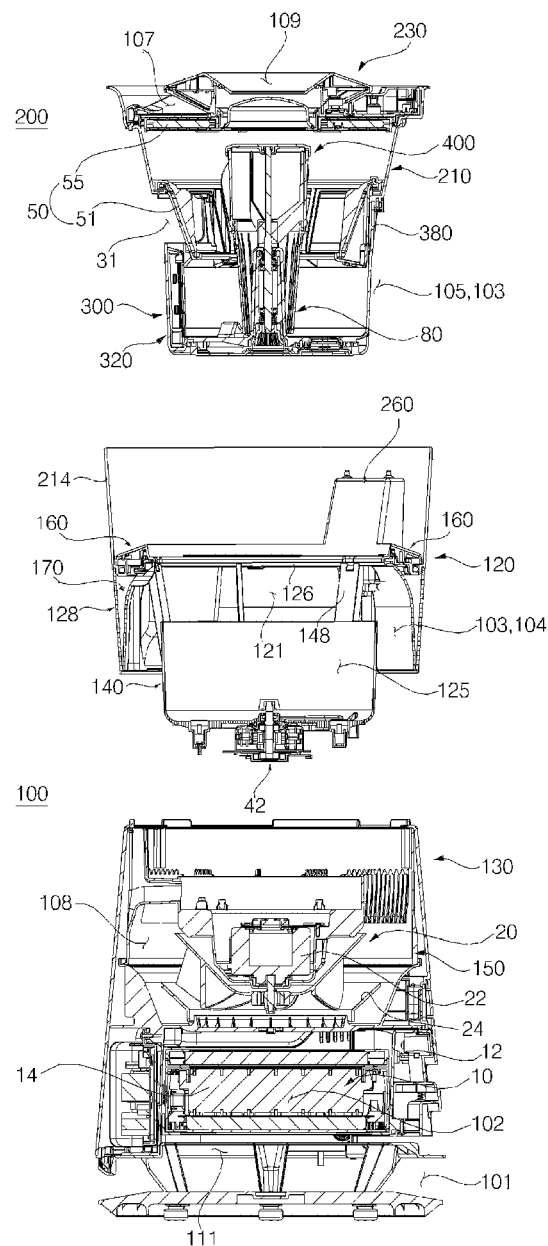
FIG. 4 is an exploded cross-sectional view of FIG. 3.
Figure 5:
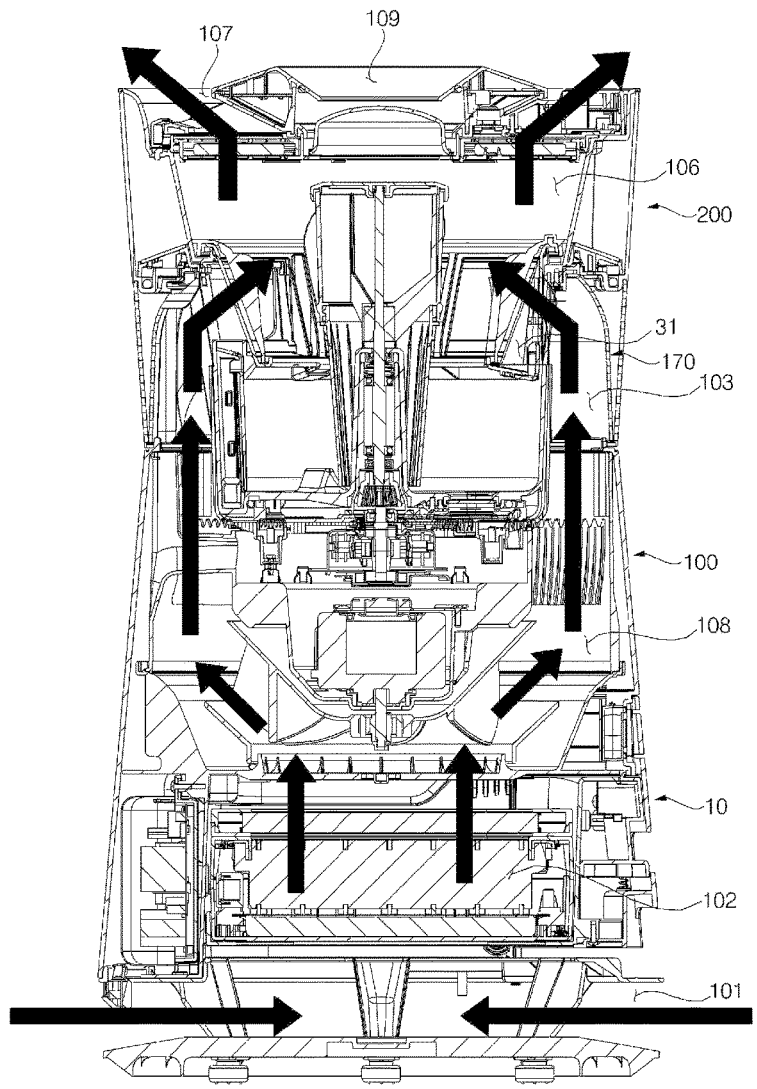
FIG. 5 is a view illustrating an air flow of the humidification and air cleaning apparatus according to the first embodiment of the present invention.

FIG. 1 is a perspective view illustrating a humidification and air cleaning apparatus according to a first embodiment of the present invention. FIG. 2 is an exploded perspective view of FIG. 1. FIG. 3 is an exploded front view of FIG. 1. FIG. 4 is an exploded cross-sectional view of FIG. 3. FIG. 5 is a perspective view illustrating an air flow of the humidification and air cleaning apparatus according to the first embodiment of the present invention.

A humidification and air cleaning apparatus according to an embodiment of the present invention may include an air clean module 100 and an air wash module 200 disposed over the air clean module 100.

The air clean module 100 may take in and filter external air, and may provide filtered air to the air wash module 200. The air wash module 200 may be supplied with filtered air, may perform humidification to provide moisture, and may discharge humidified air to the outside.

The air wash module 200 may include a water tank 300 for storing water. The water tank 300 may be separable from the air clean module 100 when the air wash module 200 is separated. The air wash module 200 may be disposed over the air clean module 100.

A user can separate the air wash module 200 from the air clean module 100, and can clean the air wash module 200 that is separated. A user may also clean the inside of the air clean module 100 from which the air wash module 200 is separated. When the air wash module 200 is separated, the upper surface of the air clean module 100 may be opened to a user.

The air clean module 100 may include a filter assembly 10 described later, and may be cleaned after the filter assembly 10 is separated from a base body 110.

A user may supply water into the air wash module 200. The air wash module 200 may have a water supply flow passage 109 formed therein to supply water from the outside to the water tank 300.

The water supply flow passage 109 may be configured to be separated from a discharge flow passage 107 from which air is discharged. The water supply flow passage 109 may be configured to supply water into the water tank 300 at any moment. For example, even when the air wash module 200 is operating, water can be supplied through the water supply flow passage. For example, even when the air wash module 200 is coupled to the air clean module 100, water can be supplied through the water supply flow passage. For example, even when the air wash module 200 is decoupled from the air clean module 100, water can be supplied through the water supply flow passage.

The air clean module 100 and the air wash module 200 may be connected to each other through a connection flow passage 103. Since the air wash module 200 is separable, the connection flow passage 103 may be distributedly disposed at the air clean module 100 and the air wash module 200. Only when the air wash module 200 is placed over the air clean module 100, the flow passage of the air wash module 200 and the flow passage of the air clean module 100 may communicate with each other through the connection flow passage 103.

The connection flow passage formed in the air clean module 100 may be defined as a clean connection flow passage 104, and the connection flow passage formed in the air wash module 200 may be defined as a humidification connection flow passage 105.

The flow of air passing through the air clean module 100 and the air wash module 200 will be described in more detail later.

Hereinafter, the air clean module 100 and the air wash module 200 will be described in more detail.

The air clean module 100 may include a base body 110, a filter assembly 10 that is disposed in the base body 110 and filters air, and an air blowing unit 20 that blows air.

The air wash module 200 may include a water tank 300, a watering unit 400, a humidification medium 50, a visual body 210, and a top cover assembly 230. The water tank 300 may store water for humidification, and may be detachably disposed over the air clean module 100. The watering unit 400 may be disposed in the water tank 300, and may spray water in the water tank 300. The humidification medium 50 may be wetted with water sprayed from the watering unit 400, and may provide moisture to flowing air. The visual body 210 may be coupled to the water tank 300, and may be formed of a transparent material. The top cover assembly 230 may be detachably disposed over the visual body 210, and may include a discharge flow passage 107 through which air is discharged and a water supply flow passage 109 through which water is supplied.

The air clean module 100 may include an intake flow passage 101, a filtering flow passage 102, an air blowing flow passage 108, and a clean connection flow passage 104 disposed therein. Air entered through the intake flow passage 101 may flow to the clean connection flow passage 104 via the filtering flow passage 102 and the air blowing flow passage 108.

The air wash module 200 may include a humidification connection flow passage 105, a humidification flow passage 106, a discharge flow passage 107, and a water supply flow passage 109 disposed therein.

When the air wash module 200 is placed over the air clean module 100, the clean connection flow passage 104 of the air clean module 100 and the humidification connection flow passage 105 of the air wash module 200 may be connected to each other.

Filtered air supplied through the humidification connection flow passage 105 of the air wash module 200 may be discharged into the indoor via the humidification flow passage 106 and the discharge flow passage 107. The water supply flow passage 109 may be manufactured into a structure in which air is not discharged and only water is supplied while communicating with the humidification flow passage 106.

First, each configuration of the air clean module 100 will be described.

The base body 110 may include an upper body 120 and a lower body 130. The upper body 120 may be disposed on the lower body 130, and the upper body 120 and the lower body 130 may be assembled.

Air may flow into the base body 110.

The intake flow passage 101, the filtering flow passage 102, and the air blowing flow passage 108 may be disposed in the lower body 130, and structures that define the intake flow passage 101, the filtering flow passage 102, and the air blowing flow passage may be disposed in the lower body 130.

A portion of the connection flow passage 103 may be disposed in the upper body 120, and structures for guiding filtered air to the air wash module 200 and structures for supporting the air wash module 200 may be disposed in the upper body 120.

The base body 110 may include the lower body 130 defining the exterior thereof and having an inlet hole 110 formed in the undersurface thereof, and the upper body 120 defining the exterior thereof and coupled to the upper side of the lower body 130.

The filter assembly 10 may be detachably assembled in the base body 110.

The filter assembly 10 may provide the filtering flow passage 102, and may filter external air. The filter assembly 10 may have a structure that is detachable from the base body 110 in a horizontal direction. The filter assembly 10 may be disposed so as to cross the flowing direction of air that flows upstream in a vertical direction. The filter assembly 10 may slide in a horizontal direction, and may filter air that flows upward in a vertical direction. The filter assembly 10 may be disposed in a horizontal direction, and may form the filtering flow passage 102 in a vertical direction.

The filter assembly 10 may slide in a horizontal direction with respect to the base body 110.

The filter assembly 10 may include a filter housing 11 disposed in the lower body 130 and forming the filtering flow passage 102, and a filter 14 separably coupled to the filter housing 11 and filtering air passing the filtering flow passage 102.

The filter housing 12 may communicate with the intake flow passage 101 at the lower side thereof, and may communicate with the air blowing flow passage 108 at the upper side thereof. Air entered through the intake flow passage 101 may flow to the air blowing flow passage 108 via the filtering flow passage 102.

The filter housing 12 may be opened at one side thereof in a direction crossing the filtering flow passage 102. The filter 14 may detachably coupled through the opened surface of the filter housing 12. The opened surface of the filter housing 12 may be formed in a lateral direction. The opened surface of the filter housing 12 may be disposed on the outer surface of the lower body 130. Accordingly, the filter 14 may be inserted through the side surface of the lower body 130, and may be located inside the filter housing 12. The filter 14 may be disposed to cross the filtering flow passage 102, and may filter air passing the filtering flow passage 102.

The filter 14 may be an electric duct collecting filter that collects foreign substances in the air by electrifying the filter using applied power. The filter 14 may be formed of a material that collects foreign substances in the air through a filter medium. The filter 14 may be disposed in various structures. The scope of the inventive invention is not limited to the filtering method or the filter medium of the filter 14.

The filtering flow passage 102 may be disposed in the same direction as the main flowing direction of the humidification and air cleaning apparatus. In this embodiment, the filtering flow passage 102 may be disposed in a vertical direction, and may allow air to flow in the opposite direction to gravity. That is, the main flowing direction of the humidification and air cleaning apparatus may be formed so as to direct from bottom to top.

The air blowing unit 20 may be disposed over the filter housing 12.

The upper side surface of the filter housing 12 may be opened, and air passing the filtering flow passage 102 may flow to the air blowing unit 20.

The air blowing unit 20 may generate flowing of air. The air blowing unit 20 may be disposed inside the base body 110, and may allow air to flow from the lower side to the upper side.

The air blowing unit 20 may include a blower housing 150, a blower motor 22, and a blower fan 24. In this embodiment, the blower motor 22 may be disposed at an upper side, and the blower fan 24 may be disposed at a lower side. The motor shaft of the blower motor 22 may direct to bottom, and may be coupled to the blower fan 24.

The blower housing 150 may be disposed inside the base body 110. The blower housing 150 may provide a flow passage of flowing air. The blower motor 22 and the blower fan 24 may be disposed in the blower housing 150.

The blower housing 150 may be disposed over the filter assembly 10, and may be disposed under the upper body 120.

The blower housing 150 may form the air blowing flow passage 108 therein. The blower fan 24 may be disposed in the air blowing flow passage 108. The air blowing flow passage 108 may connect the filtering flow passage 102 and the clean connection flow passage 104.

The blower fan 24 may be a centrifugal fan, and may blow air from the lower side thereof and discharge air to the outside in a radial direction. The blower fan 24 may discharge air to the upper side and the outside in a radial direction. The outer end of the blower fan 24 may be disposed to direct to the upper side in a radial direction.

The blower motor 22 may be disposed over the blower fan 24 to minimize contact with flowing air. The blower motor 22 may be installed so as to be covered by the blower fan 24. The blower motor 22 may not be located on the airflow passage by the blower fan 24, and may not generate a resistance against air flowing by the blower fan 24.

The upper body 120 may include an upper outer body 128 forming the exterior of the base body and coupled to the lower body 130, an upper inner body 140 disposed inside the upper outer body 128, having the water tank 300 inserted therein, and providing the connection flow passage 103, and an air guide 170 coupling the upper inner body 140 and the upper outer body 128 and guiding air to the water tank 300.

Since the upper body 120 is disposed to separate the connection flow passage and the water tank insertion space, water of the water tank 300 flowing into the connection flow passage can be minimized. Particularly, since the connection flow passage is divided by the upper inner body 140 and disposed outside a space in which water is stored, water can be inhibited from flowing into the connection flow passage.

The upper inner body 140 may be formed to be opened at the upper side thereof, and may receive the water tank 300. The upper inner body 140 may form a portion of the clean connection flow passage 104 into which filtered air flows.

The upper inner body 140 may have an upper inlet 121 formed therein and corresponding to an air wash inlet 31. The upper inlet 121 may not be an essential component. It may be sufficient if the upper body 120 has a shape that exposes the air wash inlet 31 to the connection flow passage 103.

The air guide 170 may guide air supplied through the clean connection flow passage 104 to the upper inlet 121. The air guide 170 may collect air rising along the outside of the base body 110 toward the inside. The air guide 170 may change the flowing direction of air flowing from the lower side to the upper side. However, the air guide 170 may minimize the flow resistance of air by minimizing the change angle of the flow direction of air.

The air guide 170 may cover the outside of the upper inner body 140 360 degrees of a circumference of the upper inner body 140. The air guide 170 may guide air to the water tank 300 in all directions of 360 degrees of a circumference of the water tank 300. The air guide 170 may inwardly collect air guided along the outside of the lower body 130, and may supply the collected air to the water tank 300. Through this structure, the flow rate of air supplied to the water tank 300 can be sufficiently secured.

Accordingly, the air guide 170 may include a guide part 172 formed in the flowing direction of air, and a change part 174 that is connected to the guide part 172 and changes the flow direction of guided air.

The air guide 170 may form the connection flow passage 103.

The guide part 172 may be formed in the substantially same direction as the filtering flow passage 102, and in this embodiment, may be formed in a vertical direction. The change part 174 may be formed in a direction crossing the filtering flow passage 102, and in this embodiment, may be formed in a substantially horizontal direction.

The change part 174 may be disposed at an upper side of the air guide 170. The change part 174 may be connected to the guide part 172 through a curved surface.

Although the change part 174 is formed in a horizontal direction, air passing the connection flow passage 103 may upwardly flow in a substantially oblique direction. The flow resistance of air can be reduced by allowing a connection angle of the connection flow passage 103 and the filtering flow passage 102 to be similar to the straightly traveling direction.

The lower end of the guide part 172 may be fixed to the upper outer body 128. The upper end of the change part 174 may be fixed to the upper inner body 140.

A portion of the clean connection flow passage 104 may be formed outside the upper inner body 140. The air guide 170 may form a portion of the clean connection flow passage 104. Air passing the clean connection flow passage 104 may flow into the water tank 300 through the upper inlet 121 and the air wash inlet 31.

The upper inner body 140 may have a basket shape on the whole. The upper inner body 140 may have a circular shape in horizontal section, and the clean connection flow passage 104 may be formed in all directions of 360 degrees of a circumference of the upper inner body 140.

The air guide 170 may be a component for guiding filtered air to the clean connection flow passage 104, and may be omitted in accordance with embodiments. The air guide 170 may combine the upper inner body 140 or the upper outer body 128.

The air guide 170 may be formed to cover the upper inner body 140. Particularly, the air guide 170 may be formed to cover the upper inlet 121, and may guide filtered air to the upper inlet 121. When viewed from top, the air guide 170 may have a donut shape.

In this embodiment, the upper end of the air guide 170 may adhere closely to the upper end of the upper inner body 140.

When viewed from top, the upper side surface of the air guide 170 may coincide with the upper side surface of the upper inner body 140. In this embodiment, an upper inner body ring 126 may be disposed on the upper end of the upper inner body 140 to be coupled to or adhere closely to the air guide 170.

An inner body extension part 148 may be disposed to connect the upper inner body 140 and the upper inner body ring 126. The inner body extension part 148 may be disposed in plurality. An upper inlet 121 may be formed between the inner body extension part 148 and the upper inner body ring 126.

The inner body extension part 148 may correspond to a bridge 380. When the water tank 300 is placed, the bridge 380 may be located inside the inner body extension part 148. The inner body extension part 148 and the bridge 380 may overlap each other inside and outside.

The upper end of the air guide 170 may adhere closely to or be coupled to the upper inner body ring 126. The lower end of the air guide 170 may adhere closely to or be coupled to the upper outer body 128.

Accordingly, air flowing through the clean connection flow passage 104 between the upper inner body 140 and the upper outer body 128 may be guided to the upper inlet 121.

The diameter of the upper inner body ring 126 and the diameter of the upper end of the air guide 170 may be the same as or similar to each other. The air guide 170 and the upper inner body ring may adhere closely to each other to prevent leakage of filtered air. The upper inner body ring 126 may be disposed inside the air guide 170.

A grip 129 may be formed on the upper outer body 128. The air wash module 200 may be placed in the upper body, and the whole of the humidification and air cleaning apparatus can be lifted through the grip 129.

The upper inner body 140 may have the water tank insertion space 125 formed therein so as to receive the water tank 300.

The clean connection flow passage 104 may be disposed outside the upper inlet 121, and the water tank insertion space 125 may be disposed inside the upper inlet 121. Air flowing along the clean connection flow passage 104 may pass through the upper inlet 121. When the water tank 300 is placed in the water tank insertion space 125, filtered air passing through the upper inlet 121 may flow into the water tank 300.

Meanwhile, an outer visual body 214 may be coupled to the upper side of the upper body 120.

The outer visual body 214 may be a component of the visual body 210, but in this embodiment, may be fixed to the upper body 120. Unlike this embodiment, the outer visual body 214 may also be fixed to the air wash module 200. Unlike this embodiment, the outer visual body 214 may be omitted.

The outer visual body 214 may be fixed to the upper body 120. In this embodiment, the outer visual body 214 may be coupled to the upper outer body 128. The outer visual body 214 and the outer surface of the upper outer body 128 may form a continuous surface.

The outer visual body 214 may be formed of a material through which a user can see the inside of the outer visual body 214. The outer visual body 214 may be formed of a transparent or translucent material.

A display module 160 may be disposed in at least one of the air clean module 100 or the air wash module 200 to display the operational state to a user. In this embodiment, the display module 160 may be disposed in the base body 110 to display the operational state of the humidification and air cleaning apparatus to a user.

The display module 160 may be disposed inside the outer visual body 214. The display module 160 may be disposed to adhere closely to the inner side surface of the outer visual body 214. When viewed from top, the display module 160 may have a donut shape. The water tank 300 may be inserted into the display module 160.

The display module 160 may be supported by the outer visual body 214. The inner edge of the display module 160 may be supported by the upper inner body ring 126. The display module 160 may be disposed over the air guide 170. The display module 160 may be manufactured integrally with a base connector 260.

The display module 160 may be disposed over the air guide 170. The display module 160 may be disposed between the upper outer body 128 and the upper inner body 140. The display module 160 may cover the upper outer body 128 and the upper inner body 140 such that a user cannot see a gap between the upper outer body 128 and the upper inner body 140. The inside and the outside of the display module 160 may be sealed to prevent water from permeating between the upper outer body 128 and the upper inner body 140.

The inside of the display module 160 may be supported by the upper inner body 140, and the outside of the display module 160 may be supported by the outer visual body 218.

In this embodiment, the display 160 may have a ring shape. Unlike this embodiment, the display 160 may be formed into an arc shape. The surface of the display 160 may be formed of a material that can reflect light, or may be coated with a material that can reflect light.

Accordingly, when water drops are formed on the visual body 210, water drops formed on the visual body 210 may be projected onto or reflected by the surface of the display 160. When the water drops formed on visual body 210 flows down, the same effect is also shown on the display 160.

This effect may give a visual stimulus to a user, and a user may intuitively recognize that humidification is being performed. The water drop image projected on the display 160 may give a refreshment feeling to a user, and may allow a user to know the humidification state.

The upper side surface of the display 160 may be obliquely formed. The display 160 may be obliquely disposed toward a user. Accordingly, the inside of the display 160 may be high, and the outside thereof may be low.

Hereinafter, each configuration of the air wash module 200 will be described.

The air wash module 200 may increase humidity in the filtered air. The air wash module 200 may implement a rain view in the humidification flow passage 106. The air wash module 200 may spray and circulate water in the water tank 300. The air wash module 200 may change water into small-sized droplets, and may again wash filtered air through scattered droplets. When filtered air is washed through scattered droplets, humidification and filtering may be performed once again.

The air wash module 200 may include the humidification connection flow passage 105, the humidification flow passage 106, the discharge flow passage 107, and the water supply flow passage 109.

The air wash module 200 may include the water tank 300, the watering unit 400, the humidification medium 50, the visual body 210, the top cover assembly 230, and a handle 180.

The handle 180 may be coupled to the visual body 210, may rotate in the visual body 210, and may be held in the visual body 210. A user may simply lift up only the air wash module 200 through, and may separate the air wash module 200 from the air clean module 100.

The humidification connection flow passage 105 may be disposed outside the water tank 300, and may guide air into the water tank 300. The humidification connection flow passage 105 may be disposed outside the visual body 210, and may guide air into the visual body 210.

The humidification connection flow passage 105 may be disposed at the outside of at least one of the water tank 300 and the visual body 210, and may guide air into one of the water tank 300 and the visual body 210.

The discharge flow passage 107 may be disposed between the top cover assembly 230 and the visual body 210. The discharge flow passage 107 may be disposed in at least one of the top cover assembly 230 and the visual body 210.

In this embodiment, the discharge flow passage 107 may be disposed at the outer edge of the top cover assembly 230, and the water supply flow passage 109 may be disposed at the center of the inside of the top cover assembly 230.

In the humidification and air cleaning apparatus according to this embodiment, a power source may be connected to the air clean module 100, and the air wash module 200 may be supplied with power through the air clean module 100.

Since the air wash module 200 has a structure separable from the air clean module 100, the air clean module 100 and the air wash module 200 may be provided with a separable power supply structure.

Since the air clean module 100 and the air wash module 200 are separably assembled through the upper body 120, a base connector 260 may be disposed in the upper body 120 to provide power for the air wash module 200.

The top cover assembly 230 of the air wash module 200 may be provided with a control part and a display which requires power. A top connector 270 may be disposed in the air wash module 200, and may be separably connected to the base connector 260. The top connector 270 may be disposed in the top cover assembly 230.

In this embodiment, since the top cover assembly 230 is separable, the inner side surface of the visual body 210 or the inner side surface of the water tank 300 can be conveniently cleaned.

The top cover assembly 230 may include the water supply flow passage 109 formed therein, and may form the discharge flow passage 107 with the visual body 210 in between. The top cover assembly 230 may be installed separably from the visual body 210. The top cover assembly 230 may include the top connector 270 disposed therein and electrically connected to the base connector 260.

When the top cover assembly 230 is placed, the top connector 270 may be disposed over the base connector 260. The top cover assembly 230 may be supplied with electricity from the base connector 260 via the top connector 270.

A water level display part (not shown) may be disposed around the water supply flow passage 109 to display the water level of the water tank 300. Thus, a user can check the water level of the water tank 300 when supplying water. By disposing the water level display part on the movement line of water supply, a user can be prevented from excessively supplying water, and the water tank 300 can be prevented from overflowing.

The water level display part may be disposed in the top cover assembly 230. The separable power supply structure of the top connector 270 and the base connector 260 may achieve effective water supply from the upper side.

The water tank 300 may be separably placed in the upper body 120. The watering unit 400 may be disposed inside the water tank 300, and may rotate inside the water tank 300.

The water tank 300 may include a water tank body 320 storing water, an air wash inlet 31 formed at the side surface of the water tank body 320, and a bridge 380 upwardly extending from the water tank body 320 and coupled to the visual body 210.

In this embodiment, the water tank body 320 may be formed into a cylindrical shape with an opened upper side. Unlike this embodiment, the water tank body 320 may be formed into various shapes.

The bridge 380 may upwardly extend from the water tank 300. The bridge 380 may form the air wash inlet 31. The air wash inlet 31 may be formed between the bridge 380.

The air wash inlet 31 may be formed in the side surface of the water tank body 320. The air wash inlet 31 may be formed on the water tank body 320 in all directions of 360 degrees of a circumference of the water tank body 320. The air wash inlet 31 may communicate with the humidification connection flow passage 105.

The bridge 380 may guide water flowing down from the inner side surface of the visual body 210 into the water tank 300. The noise of dropping water can be minimized by guiding water flowing down from the visual body 210.

The bridge 380 may be fastened to the lower end of the visual body 210.

In this embodiment, the air wash inlet 31 may be formed by the configuration of the water tank body 320. Unlike this embodiment, the air wash inlet 31 may also be formed by disposing the bridge 380 in the visual body 210. Also unlike this embodiment, a portion of a plurality of bridges 380 may be disposed in the water tank 300, and other bridges 380 may be disposed in the visual body 210 to configure the air wash inlet 31. Unlike this embodiment, the air wash inlet 31 may also be formed in a separate configuration distinguished from the visual body 210 and the water tank 300. Unlike this embodiment, the air wash inlet 31 may also be formed by forming an opened surface in the visual body 210 and by forming an opened surface in the water tank 300.

That is, the air wash inlet 31 may be disposed in at least one of the water tank 300 and the visual body 210. The air wash inlet 31 may be formed by combining the water tank 300 and the visual body 210. The air wash inlet 31 may be disposed in a separate configuration distinguished from the water tank 300 and the visual body 210, and then the separate configuration may be disposed between the water tank 300 and the visual body 210. The air wash inlet 31 may be formed by combination of the water tank 300 and the visual body 210.

The air wash inlet 31 may be disposed at the side of the air wash module 200, and may be connected to the humidification flow passage 106. The air wash inlet 31 may communicate or connect with the humidification connection flow passage 105.

The watering unit 400 may have a function of supplying water to the humidification medium 50. The watering unit 400 may have a function of visualizing the humidification process. The watering unit 400 may have a function of implementing a rain view inside the air wash module 200.

The watering unit 400 may draw water inside the water tank 300 by rotating a watering housing 800, may upwardly pump drawn water, and then may spray pumped water toward the outside in a radial direction. The watering unit 400 may include the watering housing 800 that draws water, upwardly pumps drawn water, and then sprays pumped water toward the outside in a radiation direction.

In this embodiment, the watering housing 800 may be rotated in order to spray water. Unlike this embodiment, water may also be sprayed using a nozzle instead of the watering housing. Water may be supplied to the humidification medium 50 by spraying water from the nozzle, and the rain view may be similarly implemented. According to embodiments, water may be sprayed from the nozzle, and the nozzle may be rotated.

Water sprayed from the watering housing 800 may wet the humidification medium 50. Water sprayed from the watering housing 800 may be sprayed toward at least one of the visual body 210 and the humidification medium 50.

Water sprayed toward the visual body 210 may implement a rain view. Water sprayed toward the humidification medium 50 may be used to humidify filtered air. The rain view may be implemented by spraying water toward the visual body 210, and then water flowing down from the visual body 210 may be used to wet the humidification medium 50.

In this embodiment, a plurality of nozzles having different heights may be disposed on the watering housing 800. Water discharged out of any one nozzle may form droplets on the inner side surface of the visual body 210 to implement a rain view, and water discharged out of another nozzle may wet the humidification medium 50 to be used for humidification.

The watering housing 800 may spray water to the inner side surface of the visual body 210, and sprayed water may flow down along the inner side surface of the visual body 210. Droplets formed in a form of water drop may be formed on the inner side surface of the visual body 210, and a user can see droplets through the visual body 210.

Particularly, water flowing down from the visual body 210 may wet the humidification medium 50 to be used for humidification. The humidification medium 50 may be wetted with water sprayed from the watering housing 800 and water flowing down from the visual body 210.

The visual body 210 may be coupled to the water tank 300, and may be located over the water tank 300. At least a portion of visual body 210 may be formed of a material through which a user can see the inside.

A display module 160 may be disposed outside the visual body 210. The display module 160 may be coupled to any one of the visual body 210 and the upper body 120.

The display module 160 may be disposed on a location where a user can observe a rain view. In this embodiment, the display module 160 may be disposed at the upper body 120.

When the air wash module 200 is placed, the outer surface of the visual body 210 may adhere closely to the display module 160. At least a portion of the surface of the display module 160 may be formed of or coated with a material that reflects light.

Droplets formed on the visual body 210 may also be projected onto the surface of the display module 160. Accordingly, a user can observe the motion of droplets at both visual body 210 and display module 160.

The water tank 300 may include the air wash inlet 31 which is formed thereon and through which air passes. The air wash inlet 31 may be located between the connection flow passage 103 and the humidification flow passage 106. The air wash inlet 31 may be an outlet of the connection flow passage 103, and may be an inlet of the humidification flow passage 106.

Filtered air supplied from the air clean module 100 may flow into the air wash module 200 through the air wash inlet 31.

The humidification medium 50 may include a water tank humidification medium 51 disposed at the inlet of the humidification flow passage 106, and a discharge humidification medium 55 disposed at the outlet of the humidification flow passage 106. The outlet of the humidification flow passage 106 and the inlet of the discharge flow passage 107 may be connected to each other. Accordingly, the discharge humidification medium 55 may be disposed at the discharge flow passage 107.

Since the connection flow passage 103, the humidification flow passage 106, and the discharge flow passage 107 are not formed of structures such as duct, it may be difficult to clearly distinguish the boundaries thereof. However, the humidification flow passage 106 in which humidification is performed is defined as between the water tank humidification medium 51 and the discharge humidification medium 55, the connection flow passage 103 and the discharge flow passage 107 may be naturally defined.

The connection flow passage 103 may be defined as between the blower housing 150 and the water tank humidification medium 51. The discharge flow passage 107 may be defined as after the discharge humidification medium 55.

In this embodiment, the water tank humidification medium 51 may be disposed at the air wash inlet 31 of the water tank 300.

The water tank humidification medium 51 may be located at at least one of the same plane, the outside, and the inside of the air wash inlet 31. Since the water tank humidification medium 51 is wetted with water for humidification, it may be desirable that the water tank humidification medium 51 is located at the inside of the air wash inlet 31.

Water flowing down after wetting the water tank humidification medium 51 may be stored in the water tank 300. Water flowing down after wetting the water tank humidification medium 51 may be configured so as not to flow out of the water tank 300.

Thus, the water tank humidification medium 51 may humidify filtered air passing through the air wash inlet 31.

Water that is naturally evaporated from humidification medium 50 may humidify filtered air. The natural evaporation means that water evaporates in a state where separated heat is not applied to water. As contact with air increases, as the flow velocity of air increases, as the pressure in the air decreases, the natural evaporation may be promoted. The natural evaporation may also be referred to as natural vaporization.

The humidification medium 50 may promote the natural evaporation of water. In this embodiment, the humidification medium 50 may be wetted with water, but may not be immersed in the water tank 300.

Since disposed separately from water stored in the water tank 300, the water tank humidification medium 51 and the discharge humidification medium 55 may not be always wet even though there is water stored in the water tank 300. That is, the water tank humidification medium 51 and the discharge humidification medium 55 may become wet only during the operation of humidification mode, and the water tank humidification medium 51 and the discharge humidification medium 55 may be maintained at a dry state during the operation of air cleaning mode.

The water tank humidification medium 51 may cover the air wash inlet 31, and air may penetrate the water tank humidification medium 51 to flow into the water tank 300.

The discharge humidification medium 55 may be disposed at the outlet of the humidification flow passage 106 or at the inlet of the discharge flow passage 107.

In this embodiment, the discharge humidification medium 55 may be disposed so as to cover the upper part of the visual body 210. The discharge humidification medium 55 may be placed on the visual body 210. Unlike this embodiment, the discharge humidification medium 55 may be coupled to the undersurface of the top cover assembly 230.

The discharge humidification medium 55 may cover the discharge flow passage 107, and humidified air may penetrate the discharge humidification medium 55 and then flow to the discharge flow passage 107.

Hereinafter, the flow of air will be described with reference to the accompanying drawings.

When the air blowing unit 20 operates, external air may flow into the base body 110 through the intake flow passage 101 formed at a lower side of the base body 110. Air entered through the intake flow passage 101 may sequentially pass the air clean module 100 and the air wash module 200 while moving upward, and may be discharged to the outside through the discharge flow passage 107 formed at an upper side of the air wash module 200.

Air entered to the intake flow passage 101 may pass the filtering flow passage 102 of the filter assembly 10, and the filter assembly 10 may filter external air.

Air passing the filtering flow passage 102 may flow to the connection flow passage through the air blowing unit 20. Air passing the filtering flow passage 102 may flow into the air blowing flow passage 108.

The filtered air may be pressurized by the blower fan 24 in the air blowing flow passage 108, and then may flow to the clean connection flow passage 104.

Since the air blowing unit 20 is disposed next to the filtering flow passage 102, the air blowing unit 20 may pressurize and blow filtered air. Through the arrangement relation of the filter assembly 10 and the air blowing unit, adherence of foreign substances like dust on the blower fan 24 can be minimized.

When the air blowing unit 20 is disposed at the front of the filtering flow passage 102, external air may first contact the blower fan 24, and thus the possibility that foreign substances adhere to the blower fan 24 may increase. When the blower fan 24 is contaminated with foreign substances, a user needs to periodically clean the blower fan 24, and a structure for cleaning the blower fan 24 may be needed.

Since the air blowing unit 20 according to this embodiment blows filtered air from which foreign substances are removed, a separate cleaning may not be needed.

Also, since the air blowing unit 20 is disposed at the front of the humidification flow passage 106, adherence of moisture on the surface of the blower fan 24 can be minimized. When moisture adheres to the surface of the blower fan 24, foreign substances may adhere to the surface of the blower fan 24 or molds grow on the blower fan 24.

Since the air blowing unit 20 is disposed at the rear of the filtering flow passage 102 and at the front of the humidification flow passage 106, the contamination of the air blowing unit 20 can be minimized.

The connection flow passage 103 may include the clean connection flow passage 104 formed in the air clean module 100 and the humidification connection flow passage 105 formed in the air wash module 200.

When the air wash module 200 is placed on the upper body 120, the clean connection flow passage 104 and the humidification connection flow passage 105 may be connected to each other. When the air wash module 200 is in a separated state, the clean connection flow passage 104 and the humidification connection flow passage 105 may be exposed to the outside.

The clean connection flow passage 104 may be formed in the upper body 120, and the humidification connection flow passage 105 may be formed in the air wash module 200.

The clean connection flow passage 104 and the humidification connection flow passage 105 may also be formed in a form of duct to form a clear flow passage. In this embodiment, the connection flow passage 103 may distributedly disposed in the structure of the upper body 120 and the structure of the water tank 300.

The connection flow passage 103 may also be formed using a configuration such as duct. However, when air is supplied into the water tank 300 through a structure such as duct, the flow resistance may significantly increase due to the duct, and it may be difficult to secure a sufficient flow rate. When the flow rate supplied into the water tank 300 is limited, RPM of the blower fan 24 needs to increase, and thus power consumption and noise may increase.

In this embodiment, the connection flow passage 103 may provide air to the water tank 300 in all directions of 350 degrees, thereby securing a sufficient flow rate.

Filtered air passing the air blowing flow passage 108 may flow into the clean connection flow passage 104 formed in the upper body 120. The air guide 170 may be disposed in the clean connection flow passage 104 of the upper body 120 to minimize the change of the flow direction of filtered air. The air guide 170 may minimize the connection angle of filtered air that flows.

In this embodiment, since the upper inner body 140 forming the water tank insertion space 125 is disposed in the upper body 120, the clean connection flow passage 104 may be directly connected to the air wash inlet 31.

Unlike this embodiment, when the height of the upper inner body 140 is small or zero, the outer wall of the water tank 300 may provide the humidification connection flow passage 105. In other words, when there is only the bottom 141 of the upper inner body 140 and no side wall of the upper inner body 140, the outside of the side wall of the water tank 300 may provide the humidification connection flow passage 105, and the inner side of the air guide 170 may provide the clean connection flow passage 104. Also, when the water tank 300 is placed on the bottom 141, the connection flow passage 103 may be connected.

In this embodiment, filtered air of the clean connection flow passage 104 may sequentially pass the upper inlet 121 and the air wash inlet 31, and then may pass the water tank humidification medium 51 to flow into the humidification flow passage 106.

The humidification flow passage 106 may be a section in which moisture is supplied to filtered air. In this embodiment, the humidification flow passage 106 may be a flow passage or a space from the water tank humidification medium 51 to the discharge humidification medium 55.

In the humidification flow passage 106, humidification may be performed through various paths.

First, in a process where filtered air passes the water tank humidification medium 51, moisture of the water tank humidification medium 51 may be naturally evaporated, and filtered air may be supplied with moisture.

Second, filtered air may be supplied with moisture by water drops scattered from the watering unit 400.

Third, humidification may be performed by moisture that is evaporated in the water tank 300.

Fourth, also in a process where filtered air passes the discharge humidification medium 55, water wetting the discharge humidification medium 55 may be naturally evaporated, and thus filtered air may be supplied with moisture.

Thus, when passing the humidification flow passage 106, filtered air may be supplied with moisture through various paths.

Air passing the discharge humidification medium 55 may be exposed to the outside through the discharge flow passage 107.

Air that is filtered and humidified may be discharged through the discharge flow passage 107. The discharge flow passage 107 may discharge air in all directions of 360 degrees with respect to the upper side and inclined direction.

Figure 6:
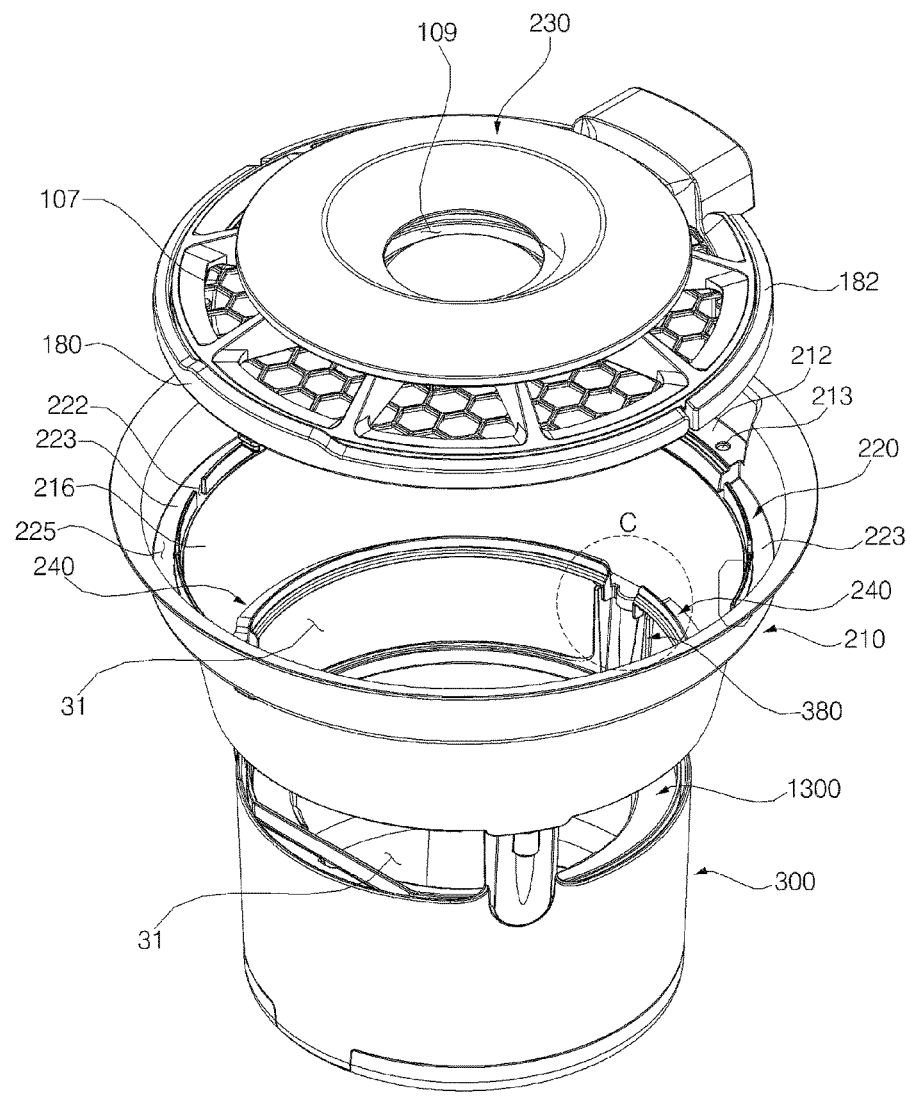
FIG. 6 is a perspective view of a water tank shown in FIG. 2.
Figure 7:
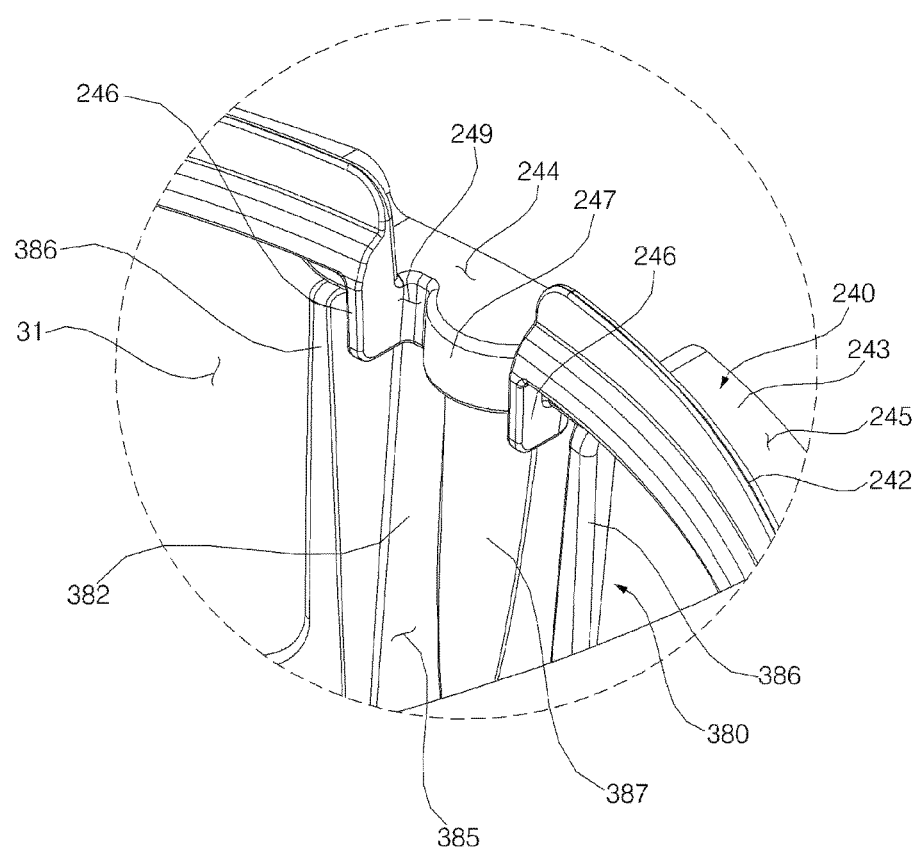
FIG. 7 is an enlarged view of C in FIG. 6.
Figure 8:
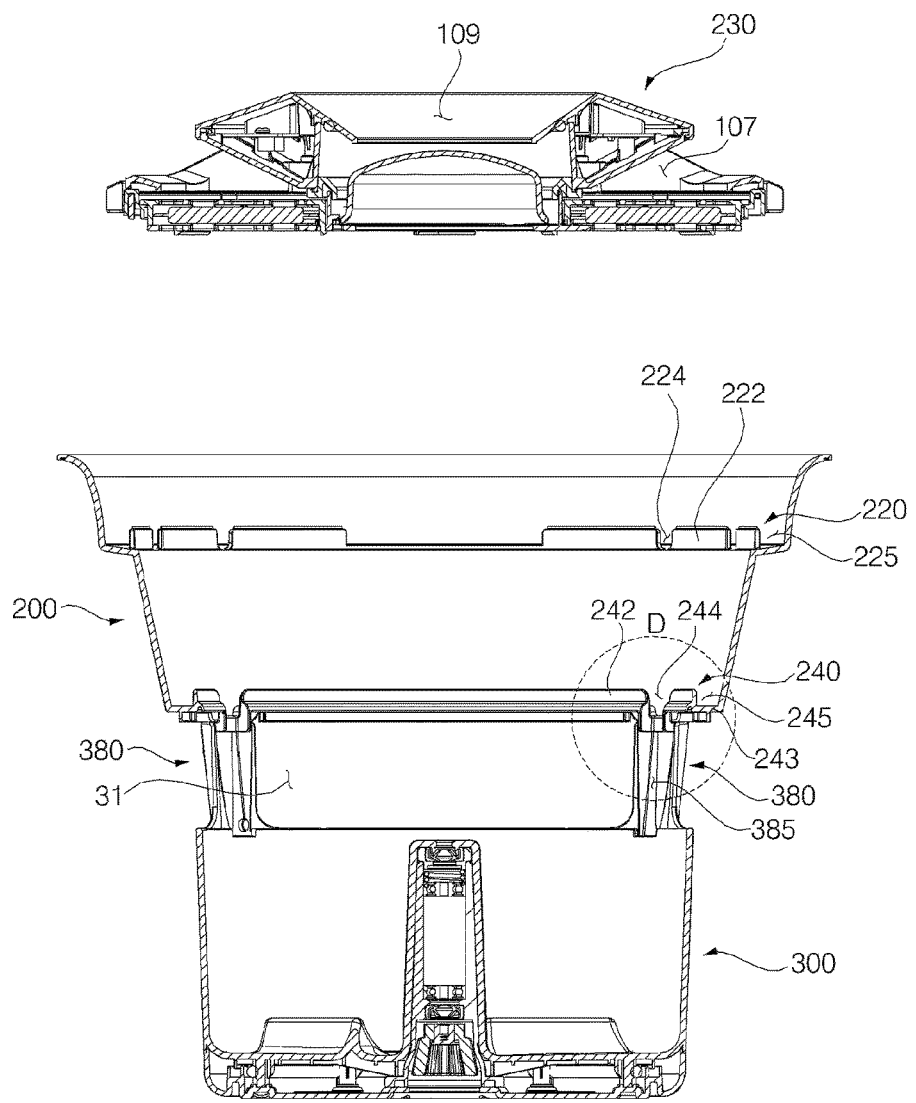
FIG. 8 is a front view of FIG. 6.
Figure 9:
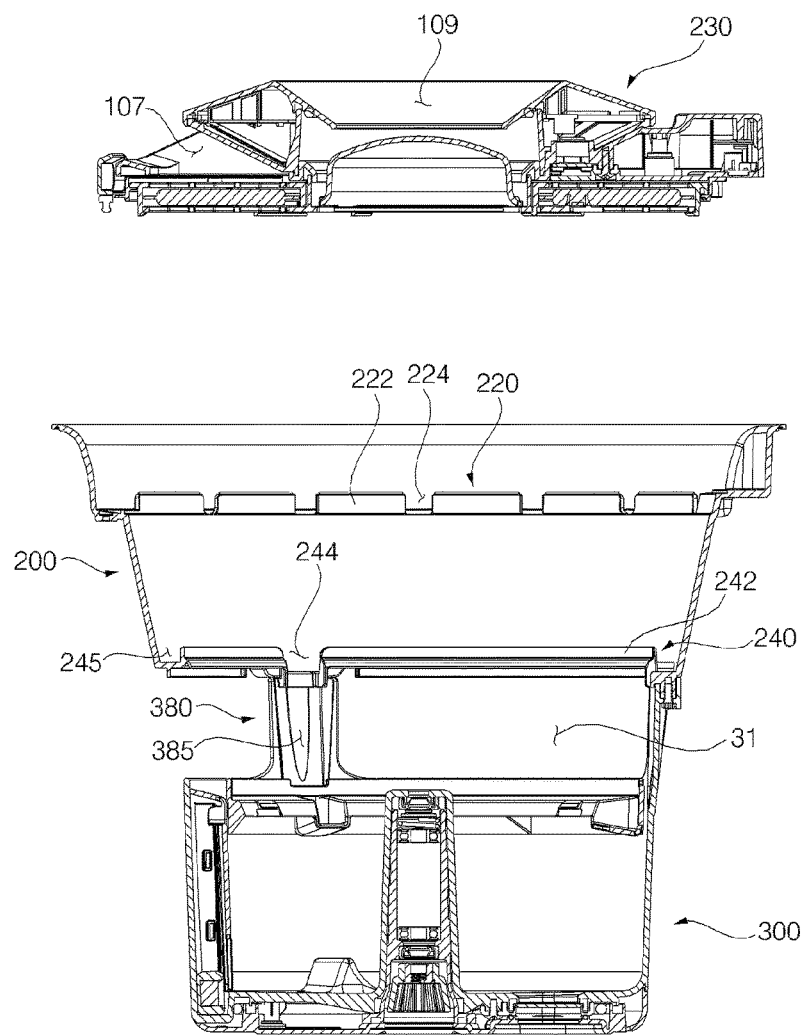
FIG. 9 is a left cross-sectional view of FIG. 6.
Figure 10:
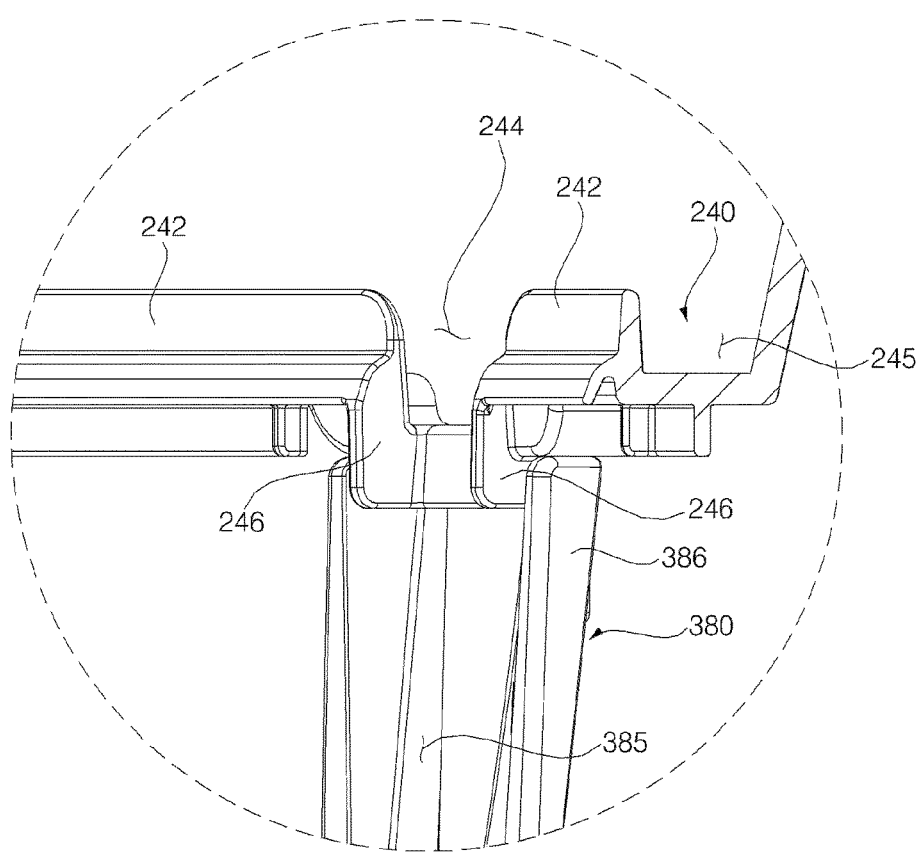
FIG. 10 is an enlarged view of D in FIG. 8.

FIG. 6 is a perspective view of a water tank shown in FIG. 2. FIG. 7 is an enlarged view of C shown in FIG. 6. FIG. 8 is a front cross-sectional view of FIG. 6. FIG. 9 is a left cross-sectional view of FIG. 6. FIG. 10 is an enlarged view of C shown in FIG. 8.

A visual body 210 configuring a water tank 300 will be described.

In this embodiment, the visual body 210 may be manufactured separated from the water tank 300, but unlike this embodiment, they may be manufactured integrally. The visual body 210 may be configured separated from the water tank 300 or may be configured in the water tank 300.

The visual body 210 may be formed of a transparent material or a translucent material, and a user may see through the inside of the visual body 210. A user may check an operating status of the inside of the water tank 300 through the visual body 210.

The visual body 210 may be integrally fixed to the water tank 300. In this embodiment, the visual body 210 may be located at the upper part of the water tank 300 and coupled to the upper side of the water tank 300. The air flowing into the inside of the water tank 300 through the air wash inlet 31 may flow into the upper side along the visual body 210.

The visual body 210 may form a continuous surface with the water tank 300 and minimize the resistance of air.

The above-mentioned outer visual body 214 may be disposed at the radial outside of the visual body 210. Unlike this embodiment, the outer visual body 214 may be omitted. In this embodiment, the visual body 210 may be used as an inner visual body.

The visual body 210 may be formed as the upper side and the lower side are opened. In this embodiment, in relation to the visual body 210, the upper side opening surface may be formed wider than the lower side opening surface. The side surface 216 of the visual body 210 may be formed slantly.

The visual body 210 may be formed in a hopper shape. The visual body 210 may be inserted into the inside of the outer visual body 214. The outer visual body 214 may be fixed to a base body 110 and the visual body 210 may be inserted into the inner part of the outer visual body 214. The upper end of the visual body 210 may closely contact the upper end of the outer visual body 214.

A reservoir for temporarily storing water may be disposed at the visual body 210. In this embodiment, the visual body 210 may include an upper reservoir 220 disposed at the inner side and storing water temporarily and a lower reservoir 240 disposed at the inner side and disposed at the lower side of the upper reservoir 220.

The reservoir of the visual body 210 may be provided in one or provided in three or more. After the water stored in the reservoir is stored temporarily, it may be moved to the lower side by gravity. The water supplied from the upper side through the reservoir may be prevented from flowing to the lower side drastically. When excessive water flows to the lower side, it may be likely to be leaked through the air wash inlet 31. Additionally, when excessive water flows to the lower side, excessive dripping noise may occur at the water surface of the water tank 300.

The upper reservoir 220 may be disposed at the lower side of a top cover assembly 230. The upper reservoir 220 may be mounted to allow the top cover assembly 230 to be detachable.

An upper storage space 225 for storing water temporarily may be formed in the upper reservoir 220 and a lower storage space 245 for storing water temporarily may be formed in the lower reservoir 240.

The upper storage space 225 may be formed by a visual body 210, a reservoir base 223, and a reservoir wall 222. The lower storage space 245 may be also formed by a visual body 210, a reservoir base 243, and a reservoir wall 242.

The reservoir bases 223 and 243 may be formed as protruding from a side surface 216 of the visual body 210 to the inside.

The reservoir walls 222 and 242 may protrude from the inside ends of the reservoir bases 223 and 243 to the upper side.

In this embodiment, the reservoir walls 222 and 242 may be formed in plurality and reservoir opening parts 224 and 244 may be disposed between the reservoir walls 222 and 242.

Temporarily-stored water may flow to the lower side through the reservoir opening parts 224 and 244.

In this embodiment, the reservoir opening parts 224 and 244 may be opened inwardly and formed. Unlike this embodiment, the reservoir opening parts 224 and 244 may be opened downwardly and formed and in this case, the reservoir opening parts 224 and 244 may be formed at the reservoir bases 223

The water drained through the upper reservoir opening part 224 may flow downwardly along the side surface 216 of the visual body 210.

The water drained through the lower reservoir opening part 244 may flow downwardly along the bridge 380.

A handle 180 may be installed at the upper reservoir 220. The handle 180 may be installed at the upper storage space 225. The handle 180 may be insertingly installed to the upper storage space 225 and concealed.

A handle fixer 182 may be fixed at the upper reservoir 220, and the handle 180 may be rotatably coupled to the handle fixer 182. Therefore, when lifting up the handle 180, a user may lift up the entire air wash module 200. Unlike this embodiment, it may be regardless that the handle fixer 182 is not installed and only the handle 180 is installed at the visual body 210.

The water tank 300 may be coupled to the lower reservoir 240. Additionally, the lower reservoir 240 may allow temporarily-stored water to flow through the bridge 380.

In this embodiment, the bridge 380 may perform various functions. The bridge 380 may be a structure for coupling the visual body 210 and the water tank 300. The bridge 380 may provide a dripping water prevention flow passage for guiding the water flowing from the upper side into the water tank 300. The bridge 380 may be a structure for forming the air wash inlet 31.

Although the bridge 380 is integrally manufactured with the water tank 300 in this embodiment, unlike this embodiment, it may be integrally manufactured with the visual body 210. Additionally, after the bridge 380 is manufactured as a separate component distinguished from the water tank 300 or the visual body 210, it may be fastened to each of the water tank 300 and the visual body 210.

The bridge 380 may guide water to the inside where the humidification flow passage 106 is disposed. A bridge space 385 may be formed inside the bridge 380. The bridge 380 may include a guide wall 386 for forming the bridge space 385.

The bridge space 385 may communicate with the lower reservoir opening part 244.

In this embodiment, the bridge space 385 may be opened toward the inside of the water tank 300 and the guide wall 386 may be disposed at both sides of the bridges 380 and surround the bridge space 386. The guide wall 386 may protrude from the side surface edge of the bridge 380 toward the inside.

A fastening structure of the water tank 300 and the visual body 210 may be formed at each of the bridge 380 and the lower reservoir 240. In order to fasten the water tank 300 and the visual body 210, a bridge fastening part 387 may be formed at the bridge 380 and a visual fastening part 247 may be formed at the lower reservoir 280.

Especially, the visual fastening part 247 may be disposed at the lower reservoir opening part 244 and the bridge fastening part 387 may be disposed at the bridge space 385. The bridge fastening part 387 and the visual fastening part 247 may be insertingly coupled to each other and then, fastened. In this embodiment, after the bridge fastening part 387 is inserted into the visual fastening part 247, fastening may be made outside the bridge 380.

Also, in order to guide the water of the lower reservoir 240 to the bridge space 385, the lower reservoir 240 may further include an insert wall 246 inserted into the bridge space 385.

The insert wall 246 may be connected to any one of the reservoir base 243 or the reservoir wall 242 and protrude downwardly.

The insert wall 246 may be formed at the both sides of the lower insert opening part 244 and form the lower insert opening part 244. The visual coupling part 247 may be disposed between the insert walls 246.

The insert wall 246 may be inserted into the bridge space 385 and disposed at the inner side of the guide wall 386. The insert wall 246 may be located between the guide walls 386 and insertingly fixed at the bridge 380.

Then, a concave channel 249 may be formed between the insert wall 246 and the visual fastening part 247. The channel 249 may be concavely formed toward the outside. The channel 249 may be a component for easily guiding the water of the lower storage space 245 to the bridge 380.

The channel 249 may downwardly extend long toward the bridge 380. A groove for forming the channel 249 may be concavely formed toward the reservoir base 243. The channel 249 may protrude further outwardly than the reservoir wall 242.

The water flowing along the reservoir wall 242 may be guided to the bridge 380 along the channel 249.

Moreover, the visual body 210 may include a connector support part on which the top connector 270 is placed. At least a portion of the top connector 270 may be placed on the connector support 212. The top connector 270 may be located over the connector support 212, and the base connector 260 may be located under the connector support 212.

The top connector 270 may be limited in horizontal movement when being placed on the connector support 212. For this, the visual body 210 may include a connector stopper 211 formed therein and limiting the horizontal movement of the top connector 270. When the top connector 270 is placed, the connector stopper 211 may be adhered closely to the side part of the top connector 270.

The visual body 210 may include a connector opening 213 formed therein. The connector opening 213 may be formed to penetrate the visual body 210. The connector opening 213 may be formed to be opened in a vertical direction.

The connector opening 213 and the connector support 212 may be disposed at different locations. In this embodiment, the connector opening 213 may be disposed in the connector support 212. A portion of the connector support 212 may be opened to form the connector opening 213.

A water flowing process through the visual body 210 will be described as follows.

First, when an upper water supply is implemented on the top cover assembly 230, water may be dropped to the humidification flow passage 106 through the water supply flow passage 109. During the upper water supply, water overflowing from the top cover assembly 230 may flow to the upper reservoir 220.

After the water temporarily stored in the upper reservoir 220 flows along the upper storage space 225, it may flow the inside of the visual body 210 through the reservoir opening part 224. The water flowing along the inner side surface 216 of the visual body 210 may be temporarily stored in the lower reservoir 240.

After the water stored in the upper reservoir 240 flows along the upper storage space 245, it may flow to the bridge 380 through the lower reservoir opening part 244. After the water flowing to the bridge 380 flows downwardly along the bridge space 385, it may be stored in the water tank 300.

In such a way, the upper reservoir 220, the side surface 216 of the visual body 210, the lower reservoir 240, and the bridge 380 may provide a dripping water prevention flow passage through which water drops. The dripping water prevention flow passage may be a structure for preventing water from directly dropping on the water surface of the water tank 300.

The upper reservoir 220, the side surface 216 of the visual body 210, the lower reservoir 240, and the bridge 380, which configure the dripping water prevention flow passage, may continuously guide water.

Especially, the lower reservoir 240 located at the upper side of the air wash inlet 31 may prevent water from dropping on the air wash inlet 31 and through this, prevent water from being leaked to the air wash inlet 31.

After the water of the lower reservoir 240 is distributed through the plurality of bridges 380, it may be guided to the water tank 300. That is, even when a large amount of water flows to one side, as the water flows along the lower storage space 245, it may buffer a flow rate through the adjacent bridge 380.

Especially, in order to prevent an excessive amount of water from being supplied to the lower reservoir 240, an inner upper frame 1312 of a water tank humidification medium housing 1300, described later, may guide flowing water to the inside of the water tank humidification medium housing 1300.

The dripping water prevention flow passage may be disposed at the water tank humidification medium housing 1300. This will be described with reference to a structure of the water tank humidification medium housing 1300 below.

Figure 11:
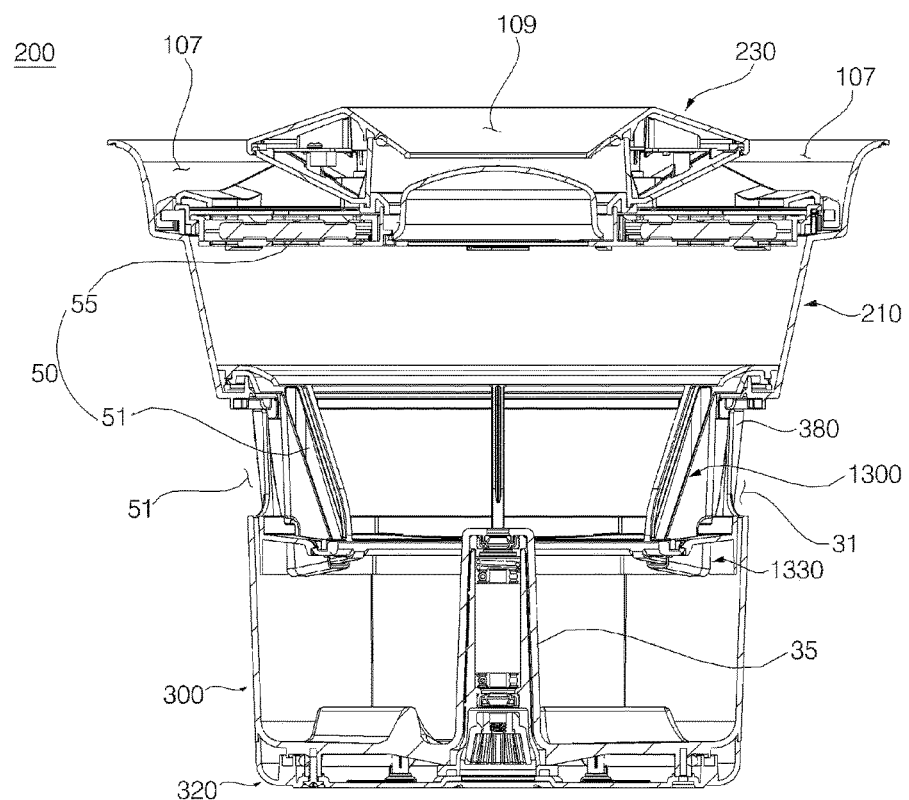
FIG. 11 is a cross-sectional view of an air wash module where a water tank humidification medium housing in FIG. 9 is mounted.
Figure 12:
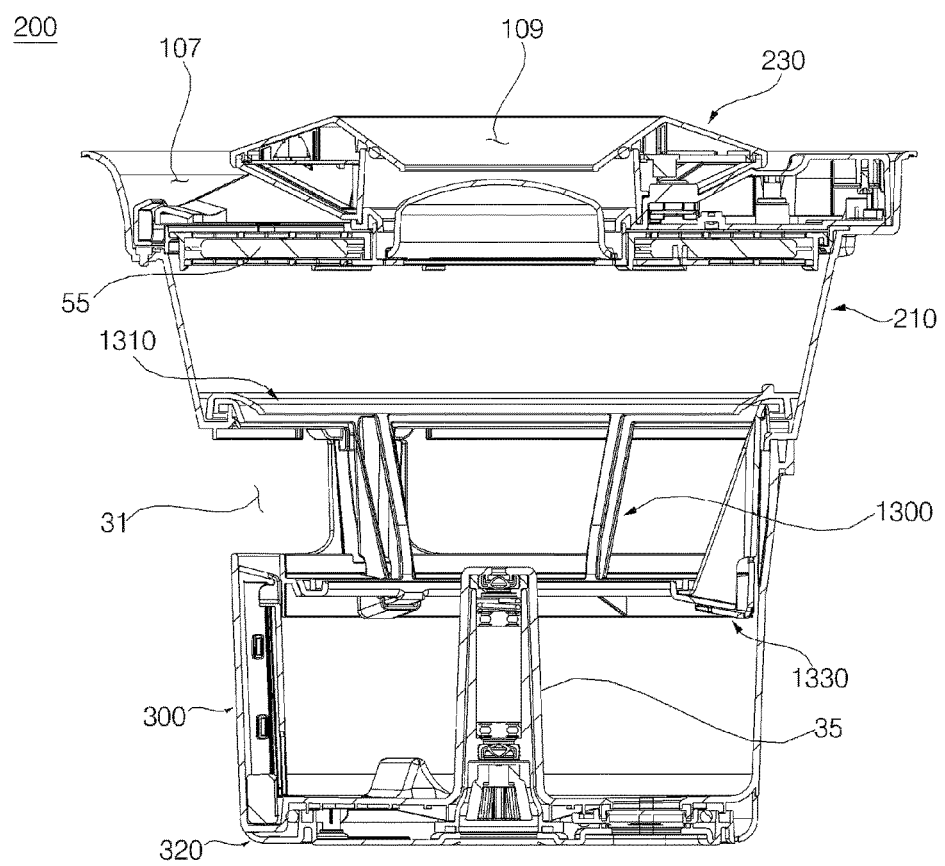
FIG. 12 is a cross-sectional view of an air wash module where a water tank humidification medium housing in FIG. 8 is mounted.
Figure 13:
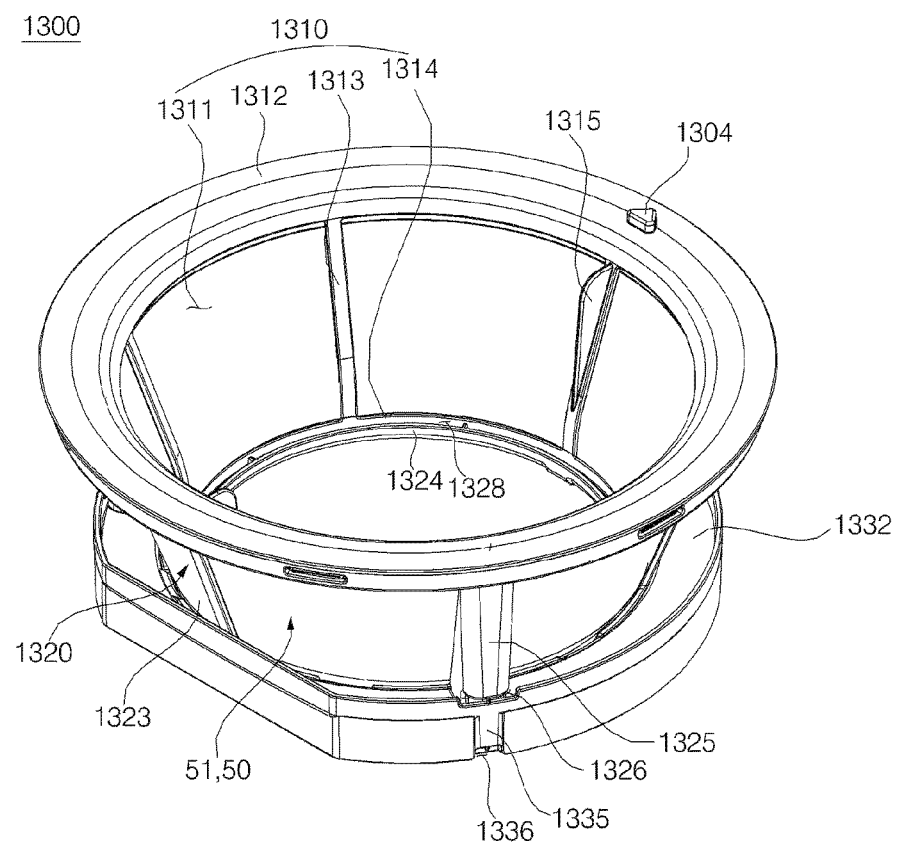
FIG. 13 is a perspective view of a water tank humidification medium housing shown in FIG. 11.
Figure 14:
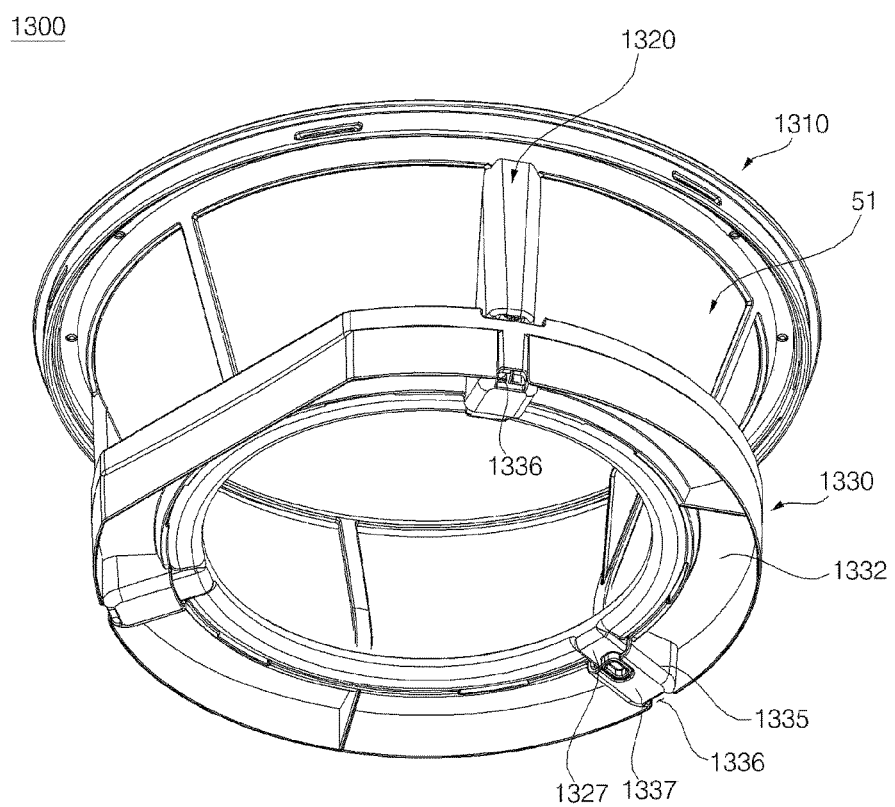
FIG. 14 is a perspective view when seen from the lower side of FIG. 13.
Figure 15:
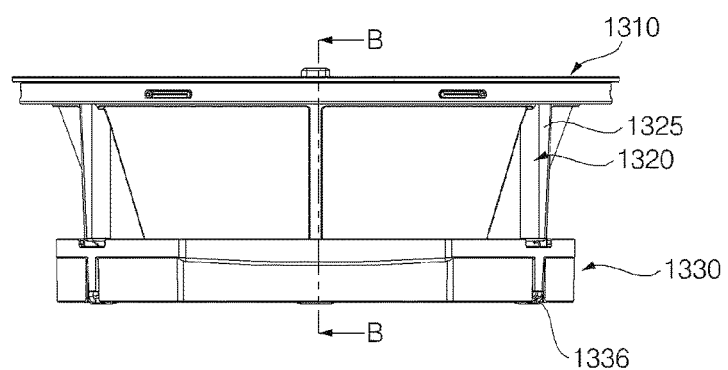
FIG. 15 is a front view of FIG. 13.
Figure 16:
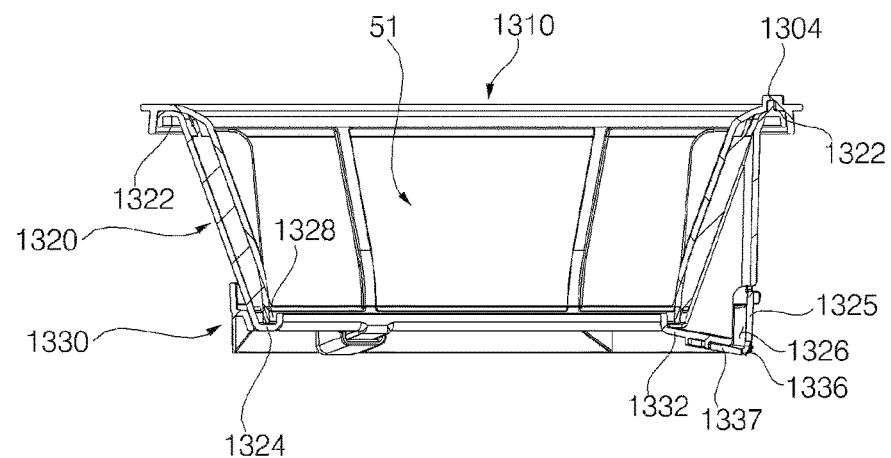
FIG. 16 is a cross-sectional view taken along a line A-A of FIG. 15.
Figure 17:
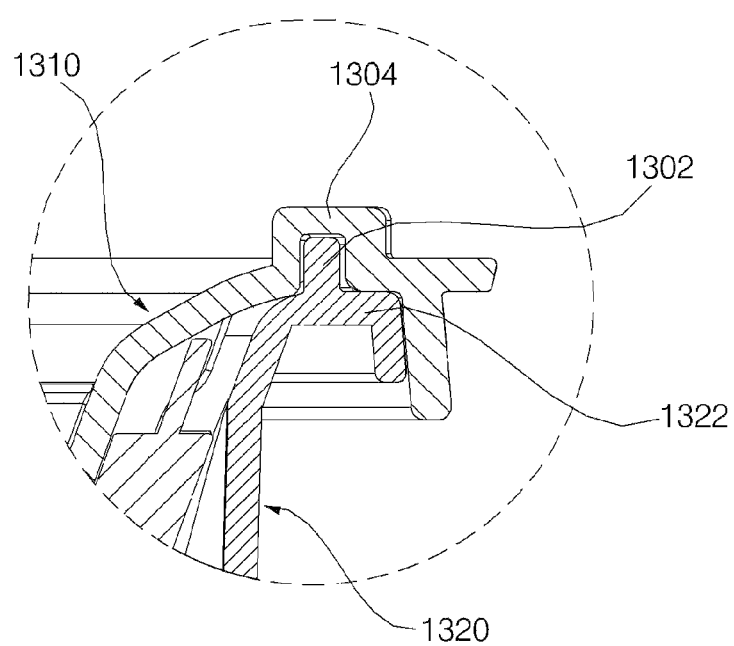
FIG. 17 is an enlarged view of B in FIG. 16.

FIG. 11 is a cross-sectional view of an air wash module where a water tank humidification medium housing is mounted in FIG. 9. FIG. 12 is a cross-sectional view of an air wash module where a water tank humidification medium housing is mounted. FIG. 13 is a perspective view of a water tank humidification medium housing shown in FIG. 11. FIG. 14 is a perspective view when seen from the lower side of FIG. 13. FIG. 15 is a front view of FIG. 13. FIG. 16 is a cross-sectional view taken along a line A-A. FIG. 17 is an enlarged view of B of FIG. 16.

Figure 18:
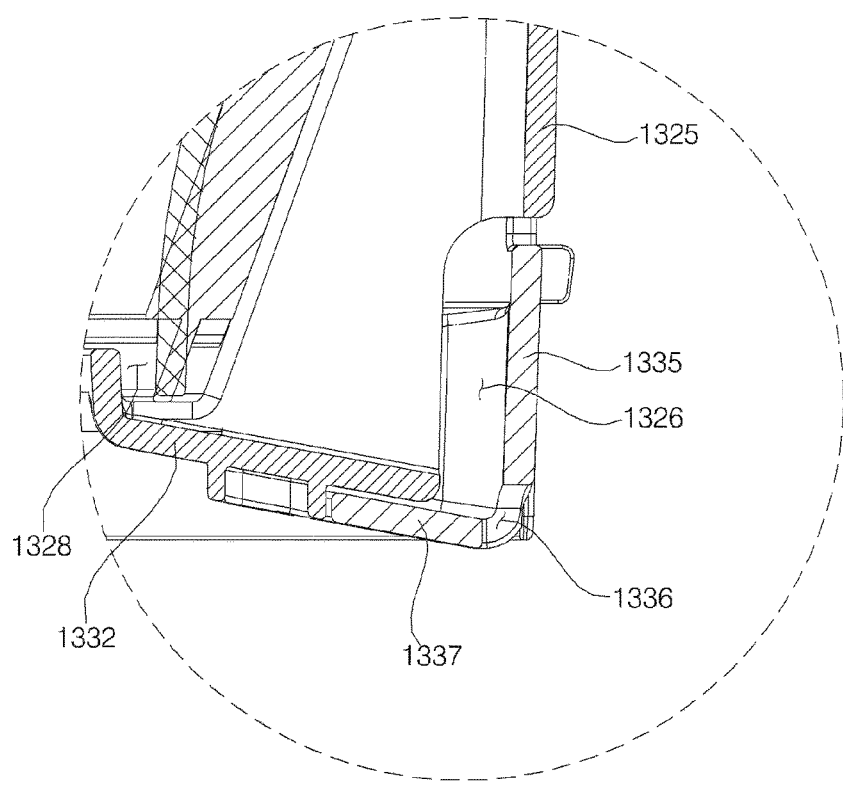
FIG. 18 is an enlarged view of C in FIG. 16.
Figure 19:
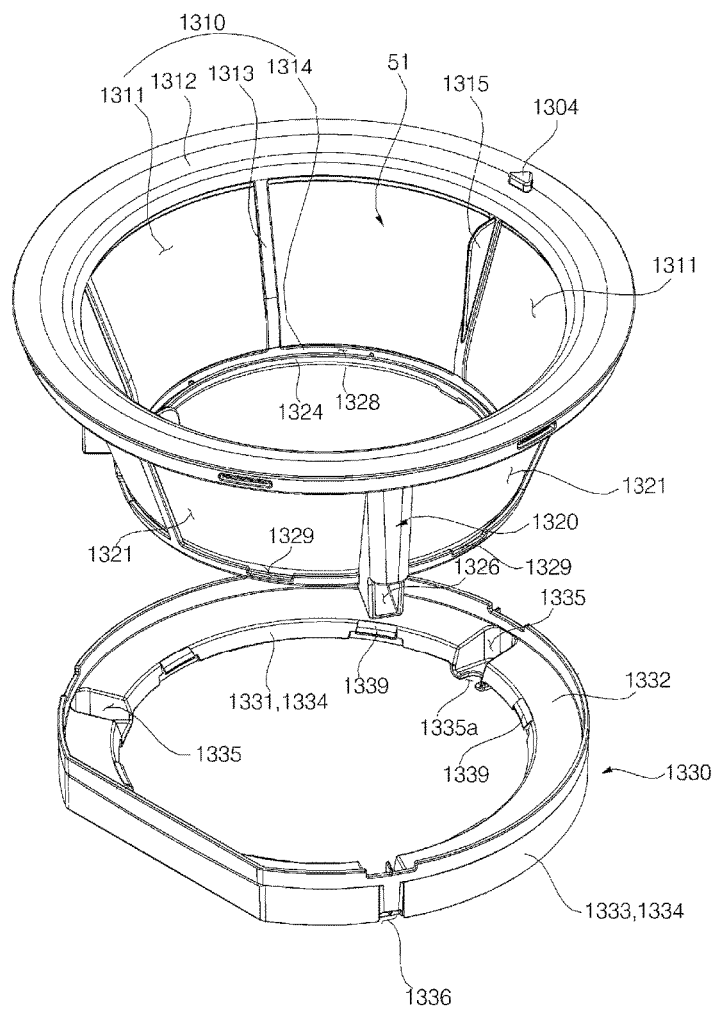
FIG. 19 is a partial exploded perspective view of FIG. 13.
Figure 20:
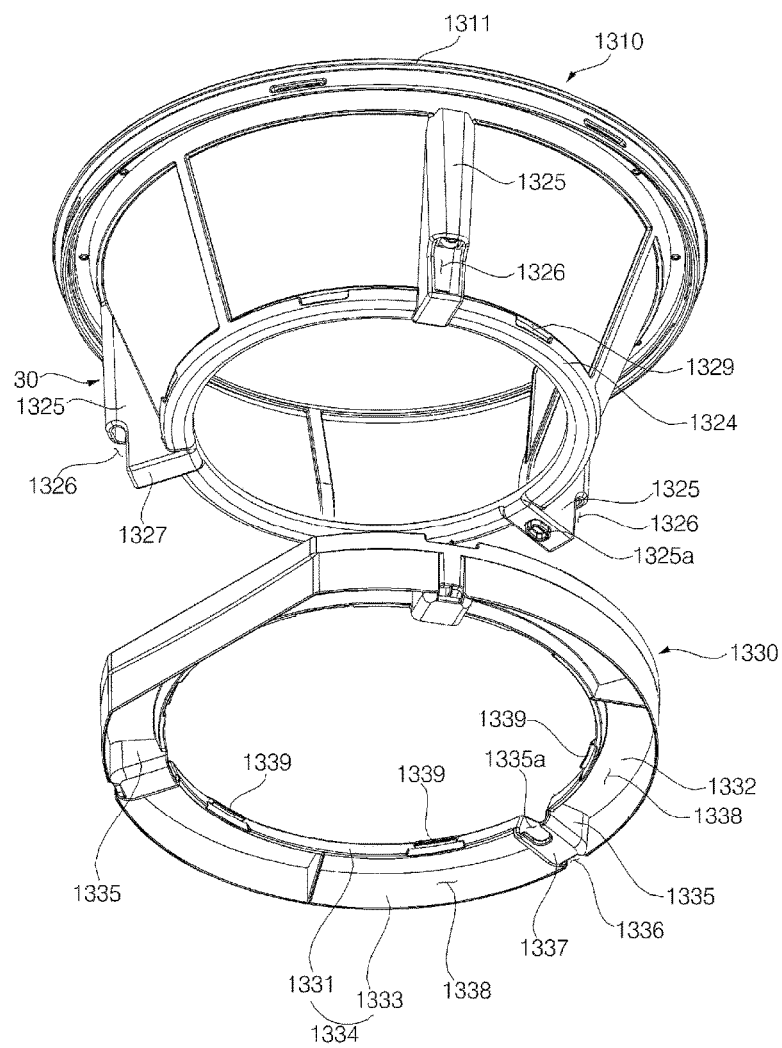
FIG. 20 is a perspective view when seen from the lower side of FIG. 19.
Figure 21:
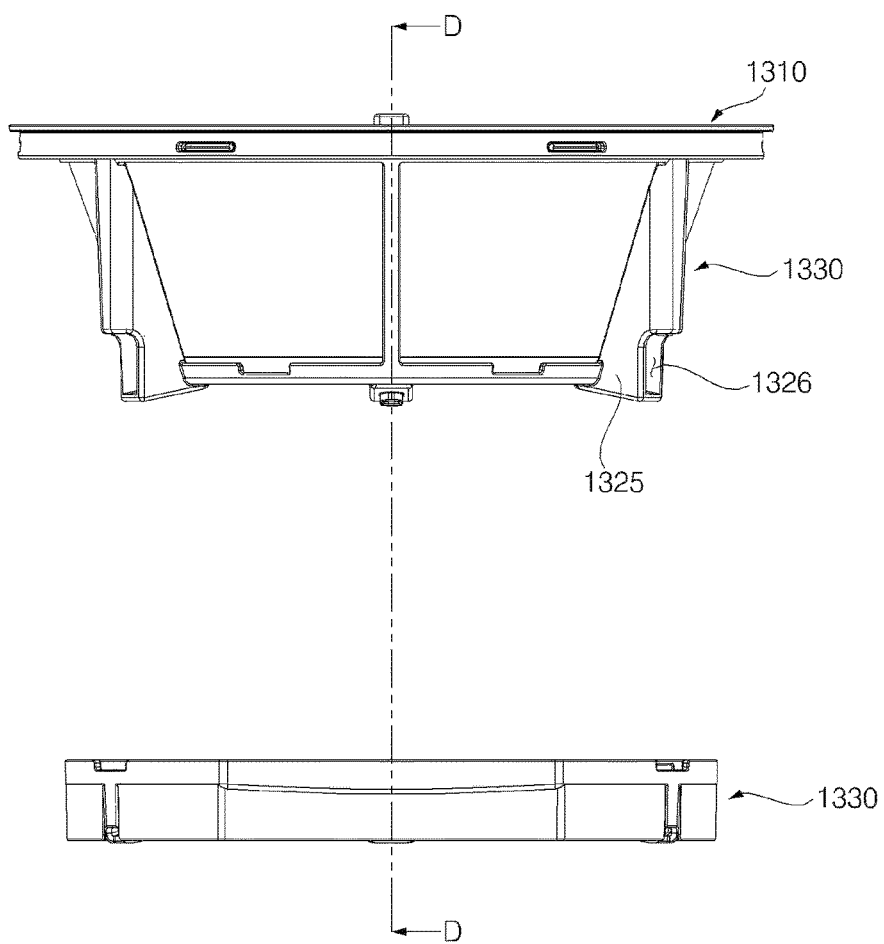
FIG. 21 is a front view of FIG. 19.
Figure 22:
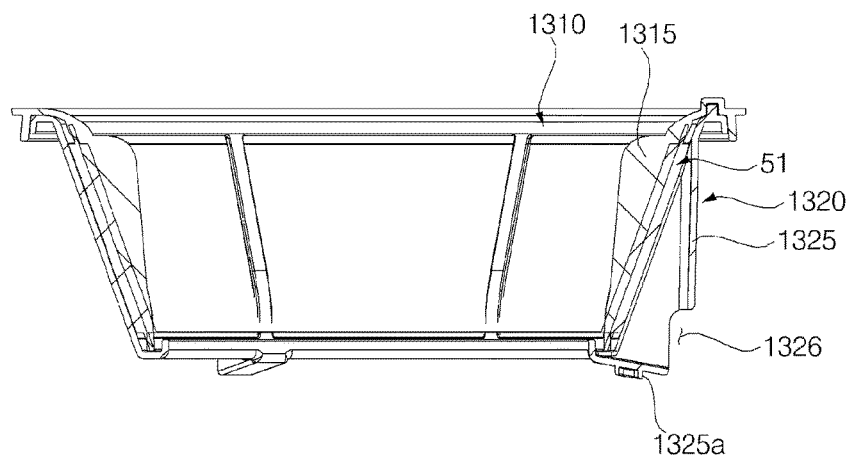
FIG. 22 is a cross-sectional view taken along a line D-D of FIG. 21.
Figure 22:
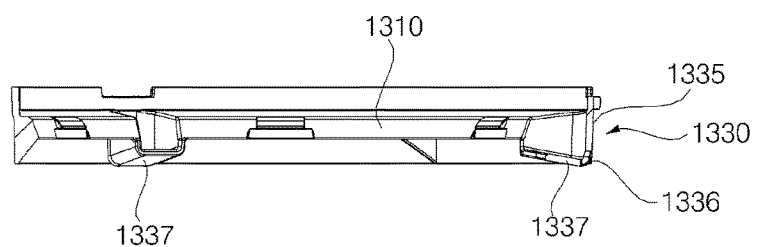

FIG. 18 is an enlarged view of C of FIG. 16. FIG. 19 is a partial exploded perspective view of FIG. 13. FIG. 20 is a perspective view when seen from the lower side of FIG. 19. FIG. 21 is a front view of FIG. 19. FIG. 22 is a cross-sectional view taken along a line D-D of FIG. 21.

Referring to the drawing, a water tank humidification medium housing will be described in more detail.

In this embodiment, a housing where the water tank humidification medium 51 in the humidification medium 51 is installed may be defined as a water tank humidification medium housing 1300.

In this embodiment, it may be characterized in that the water tank humidification medium 51 is disposed spaced from the water stored in the water tank 300. Since the water tank humidification medium 51 is separated from water, when a humidification medium is not in use, a dry status may be maintained.

When the water tank 300 is full, the lower end of the water tank humidification medium 51 may be located higher than the surface of water stored in the water tank 300.

Additionally, the water tank humidification medium housing 1300 where the humidification medium 51 is installed may be disposed spaced from water.

In this embodiment, the water tank humidification medium housing 1300 may be disposed at the water tank 300. Especially, the water tank humidification medium housing 1300 may be disposed inside the air wash inlet 31. In this embodiment, the water tank humidification medium housing 1300 may be mounted on the visual body 210 and disposed inside the water tank 300. Unlike this embodiment, the water tank humidification medium housing 1300 may be installed at the water tank 300.

The water tank humidification medium housing 1300 may pass the air entered through the air wash inlet 31. The water tank humidification medium 51 may perform humidification on the passing air.

The air passing the air wash inlet 31 may flow from the outside of the water tank 300 into the inside of the water tank 300.

The water tank humidification medium housing 1300 may supply moisture to flowing air as installing the water tank humidification medium 51 and also prevent water from overflowing from the water tank 300 as covering the upper side of the water tank 300.

For example, when an external impact is applied, the water stored in the water tank 300 may overflow from the water tank 300. For example, when the air wash module 200 is separated and moved, the water of the water tank 300 may overflow. For example, when the base body 110 is tilted, the water of the water tank 300 may overflow to the outside.

In order to prevent this, the water tank humidification medium housing 1300 may closely contact the upper edge of the water tank 300 and through this, suppress the water of the water tank 300 from overflowing to the outside.

In this embodiment, the lower end of the water tank humidification medium housing 1300 may be located inside the water tank 300. The lower end of the water tank humidification medium 51 may be also located at the inside.

Additionally, the lower end of the water tank humidification medium housing 1300 may overlap the upper end of the water tank 300. The lower end of the water tank humidification medium 51 may also overlap the upper end of the water tank 300.

The overlap may prevent the water of the water tank 300 from flowing out the air wash inlet 31. The overlap may pass the air flowing to the air wash inlet 31 through the water tank humidification medium 51 always.

In this embodiment, both the upper end and the lower end of the water tank humidification medium 51 may overlap the water tank 300. Both the upper end and the lower end of the water tank humidification medium housing 1300 may overlap the water tank 300.

When the water tank humidification medium housing 1300 is mounted at the visual body 210, the lower end closely contacts the upper edge of the water tank 300. Unlike this embodiment, as the water tank humidification medium housing 1300 is fastened or coupled to the upper end of the water tank 300, water overflowing may be prevented completely.

The upper end of the water tank humidification medium housing 1300 may be located outside the water tank 300, and the lower end may be located inside the water tank 300. Additionally, the upper end of the water tank humidification medium 51 may be located outside the water tank 300, and the lower end may be located inside the water tank 300.

Additionally, the upper end of the water tank humidification medium housing 1300 may overlap the visual body 210 and the lower end may overlap the water tank 300.

When seen from the front, the appearance of the water tank humidification medium housing 1300 may be formed slantly. When seen from the front, the water tank humidification medium 51 may be formed slantly.

The water tank humidification medium housing 1300 may include an inner medium frame 1310 disposed inside the water tank humidification medium 51, supporting the water tank humidification medium 51, and including an inner medium inlet 1311 where air passes, an outer medium frame 1320 disposed outside the water tank humidification medium 51, supporting the water tank humidification medium 51, and including an outer medium inlet 1321 where air passes, and a water overflowing prevention cover 1330 coupled to at least one of the inner medium frame 1310 or the outer medium frame 1320 and preventing the water overflowing of the water tank 300 as closely contacting the water tank 300.

The water tank humidification medium 51 may be disposed between the inner medium frame 1310 and the outer medium frame 1320. The water tank humidification medium 51 may cover the air wash inlet 31. The water tank humidification medium 51 may be formed in a ring shape. In this embodiment, the water tank humidification medium 51 may be formed in a hopper shape with a small lower cross-sectional area and a large upper cross-sectional area. The water tank humidification medium 51 may be disposed slanted with respect to a vertical direction. The slant of the water tank humidification medium 51 may consider an air flowing direction.

The air flowing to the air wash inlet 31 through the connection flow passage 103 may form a flow slanted in the upper direction rather than a horizontal movement. The slantly-formed water tank humidification medium 51 may be disposed orthogonal to the air flowing direction.

When the air flow is orthogonal to the water tank humidification medium 51, it may be possible to prevent the air from concentrating on a specific portion of the water tank humidification medium 51 and the air may be passed through evenly in the entire area.

In order to fix the water tank humidification medium 51, a humidification medium fixing means for fixing the water tank humidification medium 51 may be formed on at least one of the outer medium frame 1320 or the inner medium frame 1310.

In this embodiment, the humidification medium fixing means may be configured with a protrusion and a groove.

The humidification medium fixing means may include a fixing protrusion 1302 formed on one of the outer medium frame 1320 or the inner medium frame 1310 and a fixing groove 1302 formed on the other one. The fixing protrusion 1302 is inserted into the fixing groove 1302.

In this embodiment, the fixing protrusion 1302 may be formed at the outer medium frame 1320 and the fixing groove 1304 may be formed at the inner medium frame 1310. Unlike this embodiment, they may be disposed opposite to their locations. The discharge humidification medium 51 may be disposed between the fixing protrusion 1302 and the fixing groove 1304 and fixed when the fixing protrusion 1302 is inserted into the fixing groove 1304.

The fixing protrusion 1302 and the fixing groove 1304 may prevent the water tank humidification medium 51 from moving between the inner medium frame 1310 and the outer medium frame 1320.

In this embodiment, in order to form the fixing groove 1304, a portion of the inner medium frame 1310 may protrude upwardly.

The fixing groove 1304 may be formed to be open downwardly and the fixing protrusion 1302 may be formed to protrude upwardly.

It may have an effect that the inner medium frame 1310 is coupled to the outer medium frame 1320 by the coupling of the fixing protrusion 1302 and the fixing groove 1304.

An inner medium inlet 1311 where air passes may be formed at the inner medium frame 1310. An outer medium inlet 1321 where air passes may be formed at the outer medium frame 1320.

The inner medium inlet 1311 and the outer medium inlet 1321 may be formed to receive air in 360-degree all directions of a circumference thereof. The inner medium inlet 1311 and the outer medium inlet 1321 may be disposed facing each other.

The inner medium frame 1310 may be formed with a large upper diameter and a small lower diameter. The outer medium frame 1320 may be also formed with a large upper diameter and a small lower diameter. In this embodiment, the water tank humidification medium housing 1300 may be formed in a hopper shape as a whole.

The outer medium frame 1320 and the inner medium frame 1310 may be coupled to each other in a force fitting manner. When the outer medium frame 1320 and the inner medium frame 1310 are forcingly fitted, the water tank humidification medium 51 may be fixed.

The water overflowing prevention cover 1330 may prevent the water overflowing of the water tank 300 by covering a portion of the upper side surface of the water tank 300. Additionally, the water overflowing prevention cover 1330 may provide a function for preventing the water flowing from the upper side from directly dropping on the water surface of the water tank 300.

The water overflowing prevention cover 1330 may be assembled at the lower sides of the outer medium frame 1320 and the inner medium frame 1310. The water overflowing prevention cover 1330 may be assembled at the lower sides of the outer medium frame 1320 and the inner medium frame 1310.

The assembled outer medium frame 1320 and inner medium frame 1310 may be defined as a medium frame assembly.

The upper end of the medium frame assembly may be mounted on the visual body 210. The water flowing down along the visual body 210 may flow down along the medium frame assembly.

The water overflowing prevention cover 1330 may be disposed at the lower end of the medium frame assembly and support the medium frame assembly. The water overflowing prevention cover 1330 may temporarily store the flowing-down water and guide the temporarily-stored water to the inner side surface of the water tank 300. In this embodiment, the water overflowing prevention cover 1330 may provide a portion of a dripping water prevention flow passage.

The water overflowing prevention cover 1330 may guide the flowing-down water and minimize dripping water noise. The water overflowing prevention cover 1330 may be formed to support at least a portion of the lower end of the medium frame assembly. In this embodiment, the water overflowing prevention cover 1330 may surround the entire lower end of the medium frame assembly and prevent water from directly dropping on the water surface of the water tank 300.

The water overflowing prevention cover 1330 may be formed in a donut shape when seen from the top view. The upper side surface of the water overflowing prevention cover 1330 may collect water flowing from the medium assembly and guide the collected water to the inner side surface of the water tank 300. The lower side surface of the water overflowing prevention cover 1330 may block the inner side edge of the water tank 300 to prevent water from overflowing to the outside of the water tank 300.

The inner medium frame 1310 may include an inner upper frame 1312 mounted on the visual body 210, an inner vertical frame 1313 extending downwardly from the inner upper frame 1312 and forming the inner medium inlet 1311, and an inner lower frame 1314 connected to the inner vertical frame 1313 and mounted on the upper side surface of the water overflowing prevention cover 1330.

The inner vertical frame 1313 may be disposed in plurality between the inner upper frame 1312 and the inner lower frame 1314. The inner medium inlet 1311 may be formed between the inner upper frame 1312 and the inner lower frame 1314 and the inner vertical frame 1313.

In relation to the inner upper frame 1312, the upper side surface may be formed facing the side surface. The inner upper frame 1312 may be a guide for guiding the water flowing down along the visual body 210 to the inside. The inner upper frame 1312 may be formed with a curved surface. The exterior of the inner upper frame 1312 may closely contact the side surface 216 of the visual body 210.

The inner upper frame 1312 may be disposed at the upper side of the lower reservoir 240 and guide flowing water to the inside to save water flowing to the lower reservoir 240.

In this embodiment, a guide formed at the upper side surface of the inner upper frame 1312 may be formed with a curved surface and guide the water flowing down along the visual body 210 to the water tank humidification medium 51.

A handle 1315 may be formed at the inner vertical frame 1313. The handle 1315 may be formed in plurality. The handle 1315 may protrude toward the inner side in the inner vertical frame 1313. A user may lift up the entire water tank humidification medium housing 1300 through the handle 1315.

The inner upper frame 1312 may be formed in a ring shape and its inside may be open. The inner lower frame 1314 may be formed in a ring shape and its inside may be open.

The inner upper frame 1312 may further protrude to the outside in a radial direction than the outer medium frame 1320 to be mounted on the lower guide groove 217 of the visual body 210.

The outer medium frame 1320 may have a similar structure to the inner medium frame 1310. Like the inner medium frame 1310, the outer medium frame 1320 may include an outer medium inlet 1321, an outer upper frame 1322, an outer vertical frame 1323, and an outer lower frame 1324.

A storage space may be formed in the outer lower frame 1324. Flowing-down water may be temporarily stored in the storage space 1328. The storage space 1328 may be formed in a ring shape. A vertical wall may be formed at the inside of the outer lower frame 1324, and prevent water from overflowing to the inside. The water of the storage space 1328 may flow to an outer medium guide 1325 described later.

Unlike the inner medium frame 1310, the outer medium frame 1320 may further include the outer medium guide 1325 for connecting the outer upper frame 1322 and the outer row frame 1324.

The outer medium guide 1325 may support the outer upper frame 1322 and the outer lower frame 1324. An empty space may be formed inside the outer medium guide 1325. The outer medium guide 1325 may be connected to the storage space 1328.

The outer medium guide 1325 may drain the water of the water tank humidification medium 51 to an overflowing prevention guide 1330.

An outer medium guide hole 1326 for draining water inside to the overflowing prevention guide 1330 may be formed at the lower side end. The outer medium guide hole 1326 may form a step in a radial direction. Therefore, the outer medium guide hole 1326 may be drawn to the inside and formed. The overflowing prevention guide 1330 and the outer medium guide 1325 are mutually assembled.

The undersurface of the outer medium guide 1325 may be formed as an inclination surface 1327. The inclination surface 1327 may be formed with a high inner side and a low outer side. Therefore, the water of the outer medium guide 1325 may be guided to the outer medium guide hole 1326 along the inclination surface 1327. The outer medium guide hole 1326 may be disposed at the end of the inclination surface 1327.

In this embodiment, the outer medium guide 1325 may be disposed in three. Each of the outer medium guides 1325 may be disposed at equal intervals and disposed in a radial shape.

The water of the storage space 1328 may flow to the outer medium guide 1325 by self-load. After flowing in a circumferential direction, the water of the storage space 1328 may flow to the outer medium guide 1325 and may be drained to the water overflowing prevention cover 1330 through the outer medium guide hole 1326.

Through a structure of the storage space 1328, the outer medium guide 1325, the outer medium guide hole 1326, and the water overflowing prevention cover 1330, water may be prevented from dropping on the water surface of the water tank 300 in the water tank humidification medium housing 1300.

The water overflowing prevention cover 1330 may include a cover part 1332 for covering the upper part of the water tank 300, a barrier 1334 connected to the cover part 1332 and forming a housing space 1338 as bent from the cover part 1332, a cover insertion groove 1335 formed at the cover part 1332, where the outer medium guide 1325 is inserted, and a cover hole 1336 formed at the cover insertion groove 1335 and communicating with the inside of the water tank 300 to drain water.

The cover part 1332 may be disposed at the lower side of the medium frame assembly. The cover part 1332 may be disposed inside the water tank 300. The cover part 1332 may cover a portion of the upper part of the water tank 300. In this embodiment, the cover part 1332 may be formed along the inner side surface of the water tank 300.

The cover insertion groove 1335 may be concavely formed toward the lower side at the cover part 1332. The outer medium guide 1325 may be inserted into the cover insertion groove 1335. The cover insertion groove 1335 may be concavely formed in a vertical direction and the outer medium guide 1325 may be inserted in a vertical direction.

The outer medium guide 1325 inserted into the cover insertion groove 1335 may be restricted from moving in the lateral direction. The cover insertion groove 1335 may be spaced a predetermined interval from the outer medium guide hole 1326.

A cover hole 1336 may be formed in the cover insertion groove 1335. The cover hole 1336 may be formed through penetration in a radial direction. The cover hole 1336 may communicate with the inside of the water tank 300. The cover hole 1336 may be formed toward the inner side surface of the water tank 300. The water drained from the cover hole 1336 may flow along the inner side surface of the water tank 300.

The undersurface of the cover insertion groove 1335 may be formed as an inclination surface 1337. The inclination surface 1337 may correspond to the inclination surface 1327 of the outer medium guide 1325.

An insertion groove 1335*a* may be formed on at least one of the cover insertion grooves 1335, and an insertion part 1325*a* corresponding to the insertion groove 1335*a* may be formed at the outer medium guide 1325.

The insertion part 1325*a* may be formed protruding downwardly and inserted into the insertion groove 1335*a* in a vertical direction. The insertion part 1325*a* and the insertion groove 1335*a* may be used as a position determination means for checking a coupling position of the outer medium frame 1320 and the water overflowing prevention cover 1330. If the insertion part 1325*a* and the insertion groove 1335*a* do not match each other, the outer medium frame 1320 and the water overflowing prevention cover 1330 may not be assembled.

The cover part 1302 may closely contact the inner side surface of the water tank 300. The cover part 1302 may closely contact the upper end edge of the water tank 300. The cover part 1302 may overlap the upper end of the water tank 300. In this embodiment, the cover part 1302 may closely contact the inner side surface of the water tank 300 and closely contact the upper end edge of the water tank 300.

The inclination surface 1337 may be formed with a high inner side and a low outer side. The cover hole 1336 may be disposed at the end of the inclination surface 1337. The water discharged to the cover hole 1336 may contact the inner side surface of the water tank 300. Water may be guided to the inner side surface of the water tank 300 through the inclination surfaces 1327 and 1337.

The cover part 1332 may be formed slantly. The cover part 1332 may be formed with a high outer side and a low inner side. The inclination of the cover part 1332 may suppress water at the upper side from flowing to the outside of the cover part 1332. Water at the upper side surface of the cover part 1332 may flow to the inside along the inclination.

Water flowing along the upper side of the cover part 1332 may be guided to the storage space 1328. Therefore, water flowing down along the upper side surface of the cover part 1332 may be guided to the inner side surface of the water tank 300 through the storage space 1328, the outer medium guide hole 1326, and the cover hole 1336. It may be possible to prevent water flowing through such a structure from directly dropping on the water surface of the water tank 300.

The barrier 1334 may form the housing space 1338 together with the cover part 1332. The housing space 1338 may be formed at the lower side of the cover part 1332. When the water of the water tank 300 fluctuates, the housing space 1338 may accommodate the water fluctuating along the inner side wall of the water tank 300 and guide it to the lower side of the water tank 300.

The barrier 1334 may include an inner barrier 1331 and an outer barrier 1333.

The inner barrier 1331 and the outer barrier 1333 may be formed bent downwardly at the cover part 1332. The inner barrier 1331 may be formed along the inside edge of the cover part 1332 and bent downwardly. The outer barrier 1333 may be formed along the outside edge of the cover part 1332 and bent downwardly.

The outer barrier 1333 may closely contact the inner side surface of the water tank 300.

The inner barrier 1331 may closely contact the outer medium frame 1320. In more detail, the inner barrier 1331 may closely contact the outer lower frame 1324.

The inner barrier 1331 and the outer lower frame 1324 may be mutually coupled to each other. A stopping protrusion 1339 may be formed on at least one of the inner barrier 1331 or the outer lower frame 1324, and a stopping groove 1329 may be formed on the other one. In this embodiment, the stopping protrusion 1339 may be formed at the inner barrier 1331 and the stopping groove 1329 may be formed at the outer lower frame 1324.

In this embodiment, the water overflowing prevention cover 1330 may be disposed at the inner side of the water tank 300 and the outer barrier 1333 may closely contact the inner side surface of the water tank 300.

Therefore, in a case that water stored in the water tank 300 fluctuates, after the water rises along the inner side wall of the water tank 300, it may flow along the outer barrier 1333, the cover part 1332, and the inner barrier 1331. That is, after the water rising along the inner side wall of the water tank 300 switches its direction to the lower part in the housing space 1338, it may be guided to the center of the water tank 300 again.

In such a way, the water overflowing prevention cover 1330 may prevent the water of the water tank 300 from overflowing the outside of the water tank 300.

Additionally, the water tank humidification medium housing 1300 may provide a dripping water prevention flow passage for preventing the water flowing down from the visual body 210 to the water surface of the water tank 300 through a configuration of the inner upper frame 1312, the storage space 1328, the outer medium guide hole 1326, the cover part 1332, and the cover hole 1336.

Figure 23:
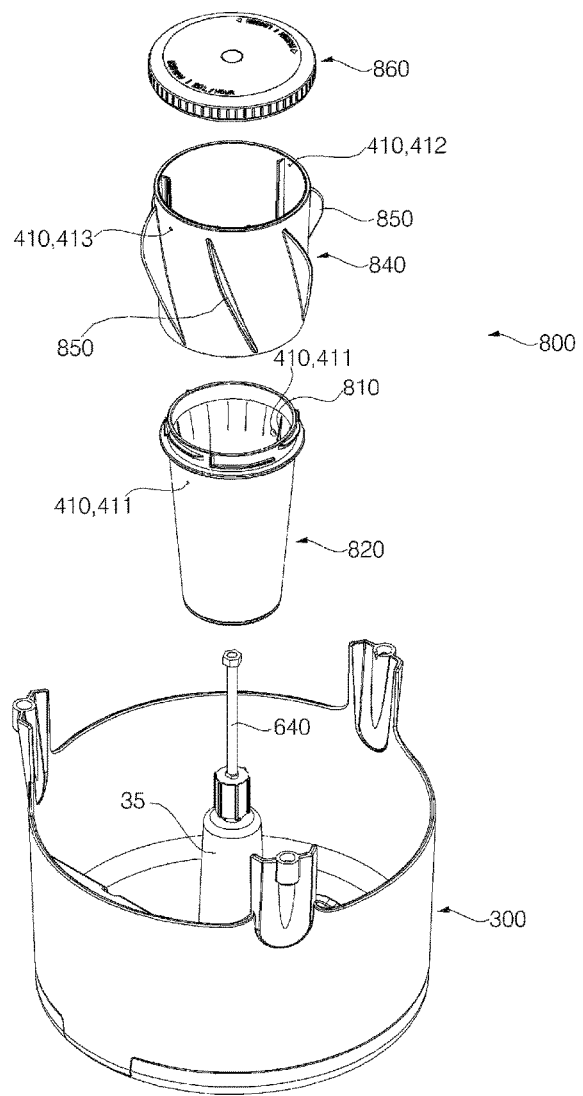
FIG. 23 is an exploded perspective view of a watering unit according to a first embodiment of the present invention.
Figure 24:
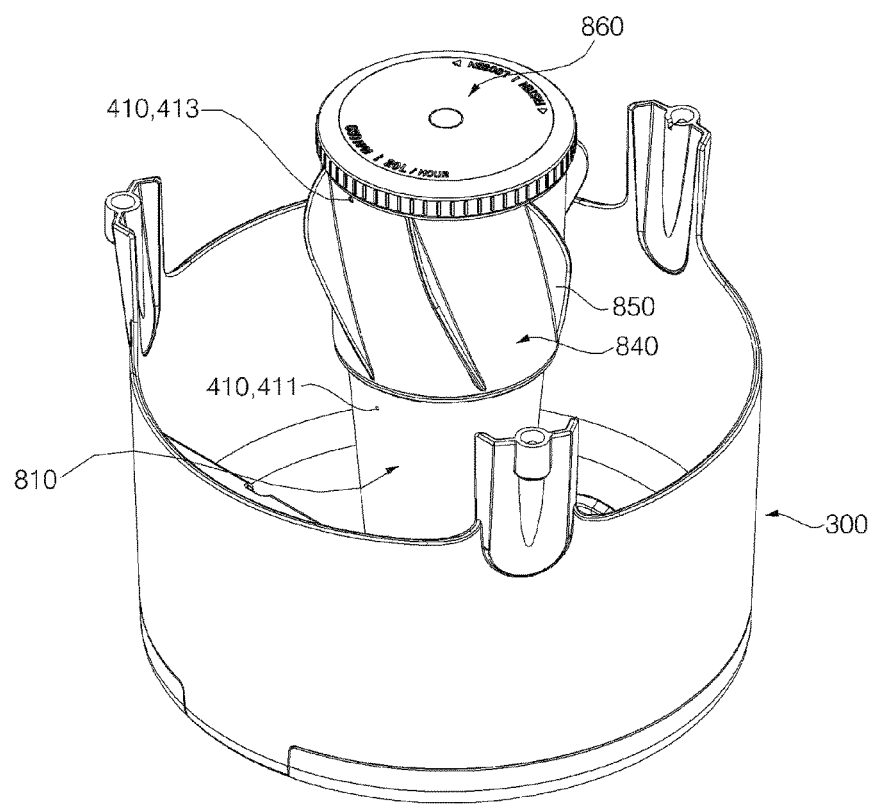
FIG. 24 is a coupling perspective view of a watering unit shown in FIG. 23.
Figure 25:
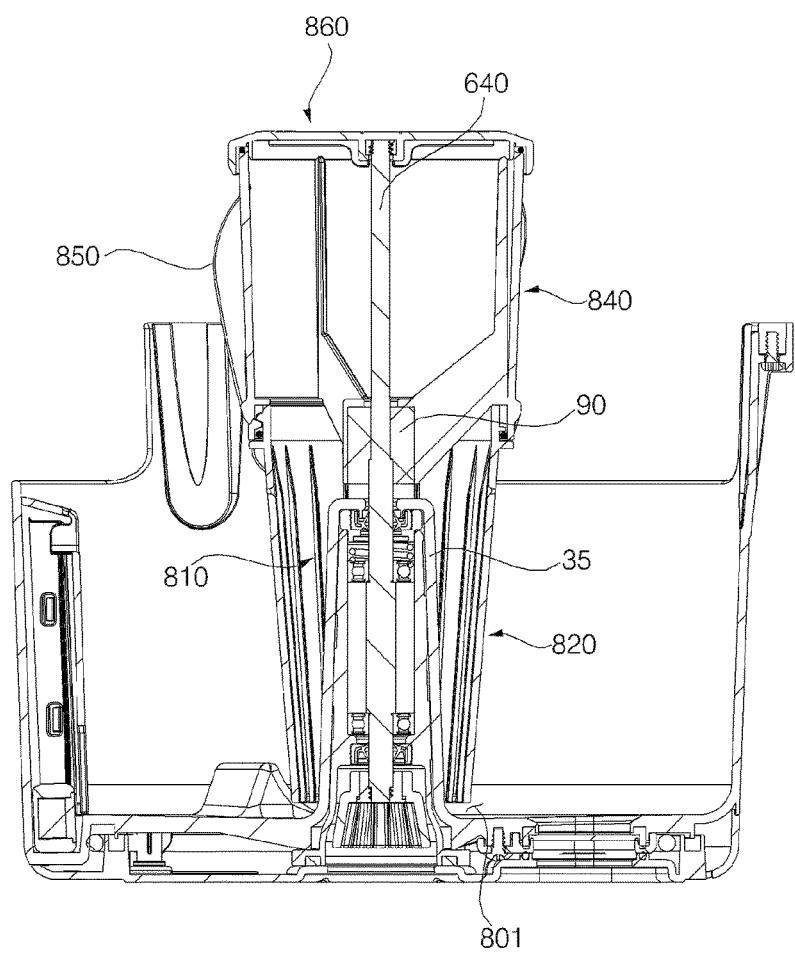
FIG. 25 is a cross-sectional view of FIG. 24.

FIG. 23 is an exploded perspective view of a watering unit according to a first embodiment of the present invention. FIG. 24 is a coupling perspective view of a watering unit shown in FIG. 23. FIG. 25 is a cross-sectional view of FIG. 24.

The watering housing 800 may be a configuration for spraying water stored in the water tank 300. The watering housing 800 may be a component for spraying water stored in the water tank 300.

The watering housing 800 may rotate by a torque of a watering motor 42, and upon rotation, may draw water stored in the water tank 300 and then pump water upward. Water pumped into the watering housing 800 may be discharged through a nozzle 410.

A pumping unit may be disposed in the watering housing 800. The pumping unit may upwardly pump water in water tank 300. The pumping of water in the water tank 300 may be implemented in various methods.

For example, water may be pumped by the pump, and then may be sprayed.

For example, the watering housing 800 may rotate, and upon rotation, may pump water through friction or mutual interference with water.

In this embodiment, a structure in which water is pumped through rotation of the watering housing may be proposed. In this embodiment, the pumping unit may be a pump groove 810 which upwardly push water through friction or mutual interference with water.

The pump groove 810 that is a pumping unit may be disposed on the inner side surface of the watering housing 800. The pump groove 810 may improve the pumping efficiency. The pump groove 810 may protrude from the inner side surface of the watering housing 800. The pump groove 810 may longitudinally extend in a vertical direction. The pump groove 810 may be radially disposed with respect to the watering motor shaft 43 or the power transmission shaft 640.

The lower end of the watering housing 800 may be spaced from the undersurface of the water tank 300 by a certain gap to form a suction gap 801. Water of the water tank 300 may be drawn into the watering housing 800 through the suction gap 801.

The watering housing 800 may be downwardly opened. The watering housing 800 may have a cup shape. The watering housing 800 may have an inverted cup shape. A housing space 805 may be formed inside the watering housing 800.

The column 35 of the water tank 300 may be located inside the watering housing 800, and a power transmission module 600 may be disposed inside the column 35. The watering housing 800 may be disposed to cover the column 35.

The watering housing 800 may be formed such that the horizontal section thereof gradually expands in an upward direction. The column 35 may be formed such that the horizontal section thereof is gradually reduced in an upward direction. The shapes of the watering housing 800 and the column 35 may be implemented in order to efficiently pump water. The capacity of housing space 805 may gradually increase in an upward direction.

When the watering housing 800 rotates, drawn water may adhere closely to the inner circumferential surface of the watering housing 800 by a centrifugal force. The pump groove 810 formed on the inner circumferential surface of the watering housing 800 may provide a torque to water drawn to the inside.

A nozzle 410 may be disposed in the watering housing 800 to discharge drawn water to the outside. In this embodiment, the nozzle 410 may be disposed so as to discharge water in a horizontal direction. Pumped water may be discharged through the nozzle 410.

In this embodiment, water discharged out of the nozzle 410 may be sprayed to the visual body 210.

The number of nozzles 410 may vary with the design conditions. In this embodiment, the nozzle 410 may be disposed in plurality while having different heights from each other in the watering housing 800. A nozzle that is disposed at an upper side of the watering housing 800 may be defined as a second nozzle, and a nozzle that is disposed at a middle side of the watering housing 800 may be defined as a first nozzle.

When the watering housing 800 rotates at the same speed as and faster than a first rotation speed, water may be sprayed from the first nozzle. When the watering housing 800 rotates at the same speed as and faster than a second rotation speed, water may be sprayed from the second nozzle.

The second rotation speed may be larger than the first rotation speed.

Only when the watering housing 800 rotates at a high speed, water may be discharged out of the second nozzle. The watering housing 800 may be disposed such that water is not discharged through the second nozzle at a usual rotation speed. The first nozzle may discharge water in all stages where watering housing ordinarily operates.

The second nozzle may be disposed in plurality. The first nozzle may be disposed in plurality.

When the watering housing 800 rotates at a usual rotation speed, pumped water may rise at least higher than the first nozzle. When the watering housing 800 rotates at a high speed, pumped water may rise to the same height as and higher than the second nozzle.

The second nozzle may be disposed in plurality in a circumferential direction of the watering housing 800. The first nozzle may also be disposed in plurality in a circumferential direction of the watering housing 800.

When the watering housing 800 does not rotate, water may not be discharged through the nozzle 410. When a user operates only clean mode (air clean module operates but air wash module stops), the watering unit 40 may not operate, and only the air blowing unit 20 may operate. When a user operates only humidification mode, the watering housing 800 may rotate, and water may be discharged out of the nozzle 410. When a user operates both air cleaning mode and humidification mode, water discharged out of the nozzle 410 may be sprayed to the inner side surface of the visual body 210.

Since the watering housing 800 rotates, water discharged from the nozzle 410 may hit the inner side surface of the visual body 210, and then may flow along the inner side surface of the visual body 210.

A user may visually check through the visual body 210 that water is sprayed. This spraying of water may mean that humidification mode is operating. Through the spraying of water, a user can intuitively check that humidification mode is operating.

Droplets may be formed on the visual body 210 by sprayed water, and the droplets may flow down.

In this embodiment, the watering housing 800 may have three parts. Unlike this embodiment, the watering housing 800 may be manufactured into one or two components.

The lower end of the watering housing 800 may be disposed to be spaced from the undersurface of the water tank 300 by a certain gap.

The watering housing 800 may include a first watering housing 820, a second watering housing 840, a watering housing cover 860, and a watering power transmission unit 880.

The watering housing 800 may be assembled with the power transmission shaft 640, and may include a structure disposed therein and receiving a torque from the power transmission shaft 640. In the watering housing 800, the watering power transmission unit 880 and the watering housing cover 860 may be assembled with the power transmission shaft 640. The watering housing 800 may be connected to the power transmission shaft 640 at two points, and may receive a torque from the two points.

The first nozzle 411 may be disposed in the first watering housing 820. In this embodiment, two first nozzles 411 may be disposed. The two first nozzles 411 may be disposed so as to direct the opposite direction to each other.

The first nozzle 411 may communicate with the inner and outer sides of the first watering housing 820. In this embodiment, the aperture area of the inside of the first nozzle 411 may be larger than the aperture area of the outside of the first nozzle 411.

A watering blade 850 may be formed on the outer circumferential surface of the second watering housing 840. The watering blade 850 may allow humidified air to flow. When the watering housing 800 rotates, the watering blade 850 may attract ambient air.

The second watering housing 840 may include second nozzles 412 and 413 formed therein. The second nozzles 412 and 413 may spray water toward the visual body 210. In this embodiment, two second nozzles 412 and 413 may be disposed. One of the two second nozzles may be defined as a 2-1 nozzle 412, and the other may be defined as a 2-2 nozzle 413.

The 2-1 nozzle 412 and the 2-2 nozzle 413 may be disposed so as to face the opposite directions to each other. The 2-1 nozzle 412 and the 2-2 nozzle 413 may be symmetrically disposed based on the power transmission shaft 640.

The spray line formed by the 2-1 nozzle 412 may be defined as a first spray line, and the spray line formed by the 2-2 nozzle 413 may be defined as a second spray line.

After the water sprayed to the nozzle 410 is temporarily stored in a reservoir disposed at the visual body 210, it may be guided to the inside of the water tank 300 through the bridge 380.

Figure 26:
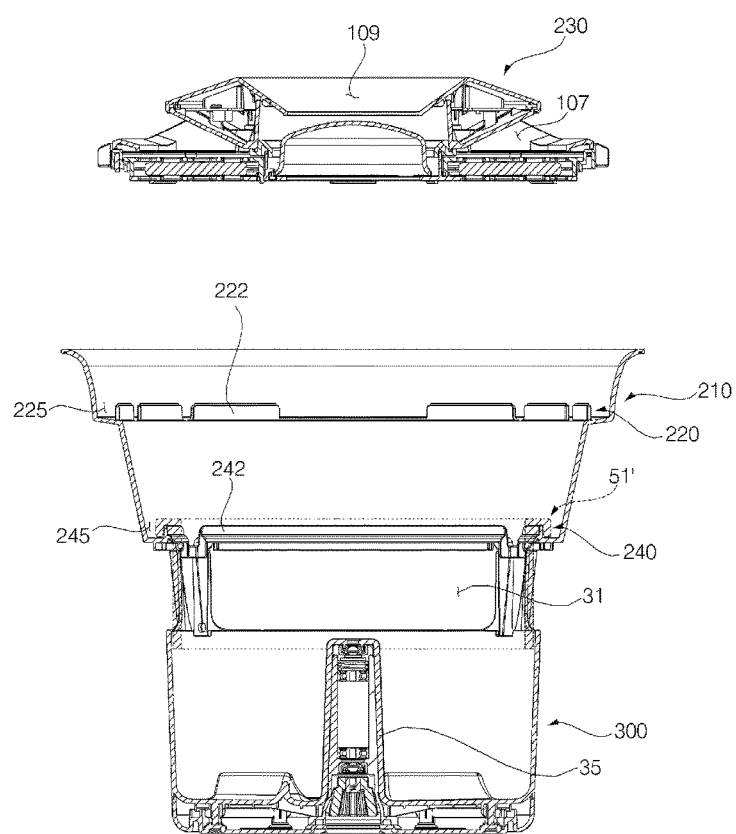
FIG. 26 is a cross-sectional view illustrating an installation state of a water tank humidification medium according to a second embodiment of the present invention.

FIG. 26 is a cross-sectional view illustrating an installation state of a water tank humidification medium according to a second embodiment of the present invention.

In this embodiment, unlike the first embodiment, a water tank humidification medium 51 may be installed without a water tank humidification medium housing.

In relation to the water tank humidification medium 51, the upper end may be mounted on the lower reservoir 240 and cover the inside of the air wash inlet 31. The water tank humidification medium 51 may be formed in a 360-degree all directions of a circumference thereof.

The water tank humidification medium 51 may be installed in a vertical direction. Unlike this embodiment, the water tank humidification medium 51 may be installed slantly. For example, the upper end may be disposed outside the water tank 300 and the lower end may be disposed inside the water tank 300, so that they may form an inclination.

The upper end of the water tank humidification medium 51 may overlap the visual body 210 and the lower end may overlap the water tank 300.

Therefore, the air entering through the air wash inlet 31 may flow into the inside of the water tank 300 through the water tank humidification medium 51'.

The upper end of the water tank humidification medium 51' may be formed in a hook shape, so that it may be caught by the lower reservoir wall 242.

In order to fix the water tank humidification medium 51' to the water tank 300, a detachable means such as Velcro tape may be further installed.

Since the upper end of the water tank humidification medium 51 is inserted into the lower storage space 245, it may be wet by the water stored in the lower reservoir 240.

Since the lower end of the water tank humidification medium 51' is located inside the water tank 300, the remaining water after the wetting may be guided to the water tank 300.

Hereinafter, since other components are identical to those of the first embodiment, a detailed description thereof will be omitted herein.

Figure 27:
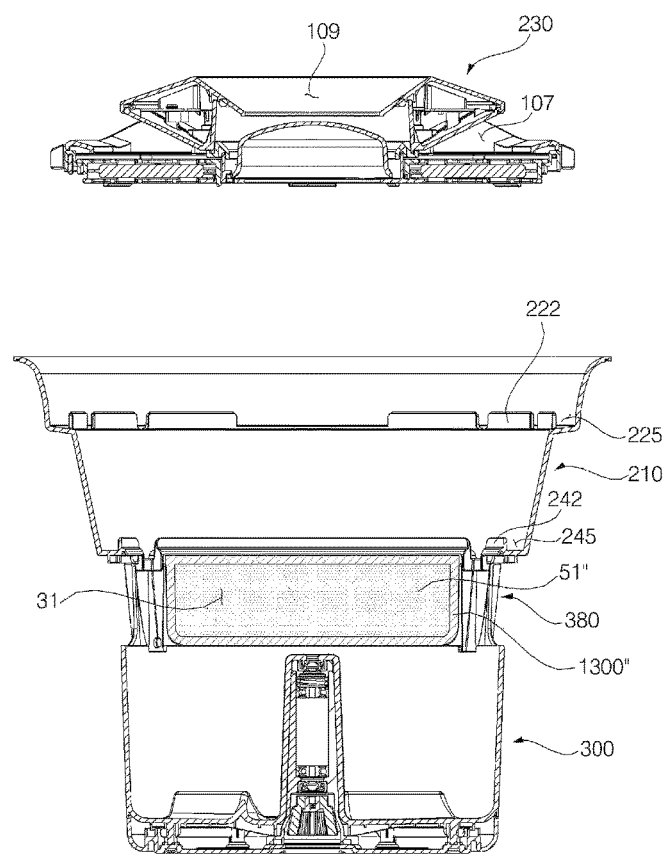
FIG. 27 is a cross-sectional view illustrating an installation state of a water tank humidification medium according to a third embodiment of the present invention.

FIG. 27 is a cross-sectional view illustrating an installation state of a water tank humidification medium according to a third embodiment of the present invention.

In this embodiment, unlike the first embodiment, a water tank humidification medium 51" may be disposed at each air wash inlet 31 separately.

In this embodiment, since three air wash inlets 31 are disposed, three water tank humidification media 51" may be installed.

Each water tank humidification medium 51" may be installed at each water tank humidification medium housing 1300". The water tank humidification medium housing 1300" may be formed in the shape of the air wash inlet 31.

Therefore, the water tank humidification medium housing 1300" where the water tank humidification medium 51" is installed may be inserted into the air wash inlet 31. The water tank humidification medium housing 1300" may be separately detachable from the air wash inlet 31.

In this embodiment, the water tank humidification medium 51" may be disposed at the same surface as the air wash inlet 31.

A humidification and air cleaning apparatus according to an exemplary embodiment of the present invention has at least one of the following effects.

First, since a water tank humidification medium covers an air wash inlet, the water of a humidification flow passage can be prevented from leaking to the outside through the air wash inlet.

Second, since the lower end of a water tank humidification medium is located in a water tank, the remaining water after wetting the water tank humidification medium can flow to the water tank.

Third, since the air passing through an air wash inlet flows from the outside to the inside, the water of a humidification flow passage can be prevented from leaking to the outside through the air wash inlet.

Fourth, when water is supplied to a water tank humidification medium in order for watering, since water is sprayed to an overlapping portion of a water tank and the water tank humidification medium, water can be prevented from leaking to the outside of an air wash inlet.

Fifth, since the upper end of a water tank humidification medium housing is mounted on a visual body and the lower end is located inside a water tank, they can cover the entire air wash inlet and prevent water from leaking to the outside of the air wash inlet.

Sixth, a water tank humidification medium housing can guide the water supplied for watering to a water tank again.

Seventh, a visual body can guide the water supplied for a rain view to a water tank again.

Eighth, a visual body can guide the water supplied for an upper water supply to a water tank again.

The effects of the present invention are not limited to the above; other effects that are not described herein will be clearly understood by the persons skilled in the art from the following claims.

Hereinafter, since other components are identical to those of the first embodiment, a detailed description thereof will be omitted herein.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A humidification and air cleaning apparatus comprising:
   a water tank to store water, the water tank comprising a bottom wall and a side wall extending upward from the bottom wall;
   an air wash inlet formed at the side wall to communicate with the inside and outside of the water tank;
   a water tank humidification medium housing located inside the wall or in the air wash inlet, the water tank humidification housing being detachably mounted to the water tank; and
   a water tank humidification medium formed of a water absorbent material to humidify air passing through the air wash inlet, the water tank humidification medium being disposed in the water tank humidification medium housing,
   wherein the water tank humidification medium covers the air wash inlet, wherein the water tank humidification medium includes a lower end and an upper end, the lower end being spaced apart from a water surface of the water tank.

2. The humidification and air cleaning apparatus of claim 1, wherein the air passing through the air wash inlet forms a pressure to flow from the outside of the water tank to the inside of the water tank.

3. The humidification and air cleaning apparatus of claim 1, wherein the air wash inlet is formed along a circumference of the water tank and the water humidification medium covers the entire air wash inlet.

4. The humidification and air cleaning apparatus of claim 1, further comprising a watering unit disposed inside the water tank to spray the water stored in the water tank, wherein water sprayed from the watering unit wets the water tank humidification medium.

5. The humidification and air cleaning apparatus of claim 4, wherein the lower end of the water tank humidification medium is overlapped with the water tank, and the watering unit sprays water to the overlapped portion.

6. The humidification and air cleaning apparatus of claim 1, wherein the water tank humidification medium housing comprises a dripping water prevention flow passage to guide water into the water tank.

7. The humidification and air cleaning apparatus of claim 6, wherein the water tank humidification housing includes an upper end and a lower end, the upper end of the water tank humidification housing being located above an upper end of the air wash inlet, and the lower end of the water tank humidification housing being located below a lower end of the air wash inlet.

8. The humidification and air cleaning apparatus of claim 6, wherein a lower end of the water tank humidification medium housing is overlapped with the water tank.

9. The humidification and air cleaning apparatus of claim 6, wherein the water tank humidification medium housing further comprises a guide to guide flowing-down water to the inside of the water tank, the guide being disposed at an upper end of the water tank humidification medium housing.

10. The humidification and air cleaning apparatus of claim 1, further comprising a visual body made of a transparent material and forming at least a portion of the water tank, wherein the air wash inlet is disposed at a lower side portion of the visual body.

11. The humidification and air cleaning apparatus of claim 10, wherein a side surface of the visual body is inclined toward the inside of the water tank.

12. The humidification and air cleaning apparatus of claim 10, wherein a reservoir to store flowing-down water is formed at the inside of the visual body and the reservoir is located at an upper side portion of the air wash inlet.

13. The humidification and air cleaning apparatus of claim 12, wherein an upper end of the water tank humidification medium housing is overlapped with the visual body and a lower end of the water tank humidification housing is overlapped with the water tank.

14. The humidification and air cleaning apparatus of claim 13, wherein the water tank humidification medium housing is detachable from the visual body.

15. The humidification and air cleaning apparatus of claim 10, further comprising a guide disposed at an upper end of the water tank humidification medium housing to guide flowing-down water to the inside of the water tank.

16. The humidification and air cleaning apparatus of claim 10, further comprising:
a reservoir formed inside the visual body to store lowing-down water; and
a guide disposed at an upper end of the water tank humidification medium housing to guide the flowing-down water to the inside of the water tank,
wherein the guide is located at an upper side of the reservoir.

17. The humidification and air cleaning apparatus of claim 10, further comprising a top cover assembly disposed at an upper inside of the visual body and forming a water supply flow passage and a discharge flow passage, wherein water flowing to the discharge flow passage flows down along the inside of the visual body and a reservoir to store the flowing-down water is formed at the visual body.

18. The humidification and air cleaning apparatus of claim 1, further comprising:
a watering unit disposed inside the water tank to spray water stored in the water tank;
wherein
the water sprayed from the watering unit wets the water tank humidification medium, and
the water tank humidification medium housing further comprises a frame disposed outside the air wash inlet and overlapped with the water tank, whereby the watering unit sprays water to the frame.

* * * * *